(12) United States Patent
Ramanasankaran et al.

(10) Patent No.: US 12,181,844 B2
(45) Date of Patent: Dec. 31, 2024

(54) BUILDING MANAGEMENT SYSTEM WITH NATURAL LANGUAGE MODEL-BASED DATA STRUCTURE GENERATION

(71) Applicant: Tyco Fire & Security GmbH, Neuhausen am Rheinfall (CH)

(72) Inventors: Rajiv Ramanasankaran, San Jose, CA (US); Krishnamurthy Selvaraj, Büchen (DE)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/419,464

(22) Filed: Jan. 22, 2024

(65) Prior Publication Data
US 2024/0345551 A1   Oct. 17, 2024

Related U.S. Application Data

(60) Provisional application No. 63/541,261, filed on Sep. 28, 2023, provisional application No. 63/528,183, (Continued)

(51) Int. Cl.
G05B 13/02    (2006.01)
G06F 16/248   (2019.01)
G06N 3/0895   (2023.01)

(52) U.S. Cl.
CPC .......... G05B 13/027 (2013.01); G06F 16/248 (2019.01); G06N 3/0895 (2023.01)

(58) Field of Classification Search
CPC .... G05B 13/027; G06F 16/248; G06N 3/0895
See application file for complete search history.

(56) References Cited

U.S. PATENT DOCUMENTS 8,731,724 B2   5/2014   Drees et al.
8,832,200 B2   9/2014   Brownholtz et al.
(Continued)

FOREIGN PATENT DOCUMENTS

EP   3 997 390 A1   5/2022
EP   3 997 391 A1   5/2022
(Continued)

OTHER PUBLICATIONS

U.S. Appl. No. 17/971,342, filed Oct. 21, 2022, Lee et al.
(Continued)

Primary Examiner — Ramesh B Patel
(74) Attorney, Agent, or Firm — Foley & Lardner LLP

(57) ABSTRACT

Systems and methods are disclosed relating to building management systems with language model-based data structure generation. For example, a method can include receiving a query to select, from a plurality of data sources of a building management system, a selected one or more data sources according to a characteristic indicated by the query in at least one of a natural language representation or a semantic representation. The method can further include applying the query as input to a machine learning model to cause the machine learning model to generate an output indicating the selected one or more data sources, the machine learning model configured using training data comprising sample data and metadata from the plurality of data sources. The method can further include presenting, using at least one of a display device or an audio output device, the output.

20 Claims, 13 Drawing Sheets

Related U.S. Application Data filed on Jul. 21, 2023, provisional application No. 63/466,203, filed on May 12, 2023, provisional application No. 63/458,871, filed on Apr. 12, 2023.

(56) References Cited

U.S. PATENT DOCUMENTS

| | | | |
|---|---|---|---|
| 9,244,964 | B2 | 1/2016 | Bhatt et al. |
| 9,568,910 | B2 | 2/2017 | Drees et al. |
| 9,696,073 | B2 | 7/2017 | Noboa et al. |
| 9,753,455 | B2 | 9/2017 | Drees |
| 9,778,639 | B2 | 10/2017 | Boettcher et al. |
| 10,095,756 | B2 | 10/2018 | Park et al. |
| 10,175,681 | B2 | 1/2019 | Wenzel et al. |
| 10,281,363 | B2 | 5/2019 | Vitullo et al. |
| 10,372,146 | B2 | 8/2019 | Vitullo |
| 10,417,245 | B2 | 9/2019 | Park et al. |
| 10,528,020 | B2 | 1/2020 | Drees |
| 10,700,942 | B2 | 6/2020 | Hamilton et al. |
| 10,706,375 | B2 | 7/2020 | Wenzel et al. |
| 10,742,739 | B2 * | 8/2020 | Evans ............... H04L 41/0816 |
| 10,747,187 | B2 | 8/2020 | Perez |
| 10,761,547 | B2 | 9/2020 | Risbeck et al. |
| 10,969,775 | B2 | 4/2021 | Khalate et al. |
| 10,997,294 | B2 * | 5/2021 | Kenyon ............... G06F 21/564 |
| 11,038,709 | B2 * | 6/2021 | Park ................... H04L 12/2827 |
| 11,067,955 | B2 | 7/2021 | Patel et al. |
| 11,092,954 | B2 | 8/2021 | Vitullo et al. |
| 11,108,587 | B2 * | 8/2021 | Park ................... G06F 16/9024 |
| 11,164,159 | B2 | 11/2021 | Ma et al. |
| 11,188,411 | B1 | 11/2021 | Shen et al. |
| 11,272,011 | B1 * | 3/2022 | Laughton ............. G06F 16/285 |
| 11,275,348 | B2 | 3/2022 | Park et al. |
| 11,281,173 | B2 | 3/2022 | Turney et al. |
| 11,416,796 | B2 | 8/2022 | Przybylski et al. |
| 11,449,454 | B2 | 9/2022 | Cayemberg et al. |
| 11,636,206 | B2 * | 4/2023 | Kenyon ............... G06F 21/554 726/23 |
| 11,704,311 | B2 * | 7/2023 | Ramanasankaran ........................ G06F 16/275 707/718 |
| 11,714,930 | B2 * | 8/2023 | Ramanasankaran .... G06F 30/27 703/1 |
| 11,720,571 | B2 * | 8/2023 | Evans .................. H04L 67/12 709/246 |
| 11,755,501 | B2 * | 9/2023 | Ray ................... G06N 3/084 710/241 |
| 11,769,066 | B2 * | 9/2023 | Ramanasankaran ........................ G06F 16/9035 706/47 |
| 11,847,420 | B2 * | 12/2023 | Galitsky ............... G06F 16/248 |
| 11,894,944 | B2 * | 2/2024 | Ploegert ............... G06F 16/288 |
| 11,960,844 | B2 * | 4/2024 | Galitsky ............... G06F 40/205 |
| 12,088,599 | B1 | 9/2024 | McCarson |
| 2005/0170842 | A1 | 8/2005 | Chen |
| 2006/0041534 | A1 | 2/2006 | Atwell |
| 2008/0015881 | A1 | 1/2008 | Shankar |
| 2008/0209255 | A1 | 8/2008 | Seguin et al. |
| 2012/0079100 | A1 | 3/2012 | McIntyre et al. |
| 2014/0179222 | A1 | 6/2014 | Chaudhary et al. |
| 2015/0316907 | A1 | 11/2015 | Elbsat et al. |
| 2016/0377306 | A1 | 12/2016 | Drees et al. |
| 2017/0102162 | A1 | 4/2017 | Drees et al. |
| 2017/0103483 | A1 | 4/2017 | Drees et al. |
| 2017/0153936 | A1 | 6/2017 | Vorganti |
| 2018/0046173 | A1 | 2/2018 | Ahmed |
| 2018/0341255 | A1 | 11/2018 | Turney et al. |
| 2019/0028587 | A1 | 1/2019 | Unitt et al. |
| 2019/0057450 | A1 | 2/2019 | Mark et al. |
| 2019/0186766 | A1 | 6/2019 | Maslekar et al. |
| 2019/0271978 | A1 | 9/2019 | Elbsat et al. |
| 2019/0295034 | A1 | 9/2019 | Wenzel et al. |
| 2019/0311332 | A1 | 10/2019 | Turney et al. |
| 2019/0325368 | A1 | 10/2019 | Turney et al. |
| 2019/0338974 | A1 | 11/2019 | Turney et al. |
| 2019/0339661 | A1 | 11/2019 | Pancholi et al. |
| 2019/0347622 | A1 | 11/2019 | Elbsat et al. |
| 2020/0076835 | A1 * | 3/2020 | Ladnai ............... G06Q 10/0635 |
| 2020/0090289 | A1 | 3/2020 | Elbsat et al. |
| 2020/0096985 | A1 | 3/2020 | Wenzel et al. |
| 2020/0125954 | A1 | 4/2020 | Truong et al. |
| 2020/0142365 | A1 | 5/2020 | Sharma et al. |
| 2020/0162280 | A1 | 5/2020 | Drees et al. |
| 2020/0250774 | A1 | 8/2020 | Agarwal et al. |
| 2020/0258057 | A1 | 8/2020 | Farahat et al. |
| 2020/0301408 | A1 | 9/2020 | Elbsat et al. |
| 2020/0302058 | A1 * | 9/2020 | Kenyon ............... G06F 21/554 |
| 2020/0320414 | A1 | 10/2020 | Neumann |
| 2020/0348038 | A1 | 11/2020 | Risbeck et al. |
| 2020/0355391 | A1 | 11/2020 | Wenzel et al. |
| 2020/0356087 | A1 | 11/2020 | Elbsat et al. |
| 2021/0010693 | A1 | 1/2021 | Gamroth et al. |
| 2021/0010701 | A1 | 1/2021 | Nesler et al. |
| 2021/0011443 | A1 | 1/2021 | McNamara et al. |
| 2021/0011444 | A1 | 1/2021 | Risbeck et al. |
| 2021/0018211 | A1 | 1/2021 | Ellis et al. |
| 2021/0043208 | A1 | 2/2021 | Luan et al. |
| 2021/0072709 | A1 | 3/2021 | Oliver et al. |
| 2021/0072742 | A1 | 3/2021 | Wu et al. |
| 2021/0173366 | A1 | 6/2021 | Turney et al. |
| 2021/0200164 | A1 | 7/2021 | Ploegert et al. |
| 2021/0200173 | A1 | 7/2021 | Ploegert et al. |
| 2021/0200807 | A1 | 7/2021 | Ploegert et al. |
| 2021/0233008 | A1 | 7/2021 | Gupta et al. |
| 2021/0256534 | A1 | 8/2021 | An et al. |
| 2021/0286989 | A1 | 9/2021 | Zhong et al. |
| 2021/0303481 | A1 * | 9/2021 | Ray ..................... G06N 3/044 |
| 2021/0343406 | A1 | 11/2021 | McMillan et al. |
| 2021/0364181 | A1 | 11/2021 | Risbeck et al. |
| 2021/0373519 | A1 | 12/2021 | Risbeck et al. |
| 2021/0390128 | A1 | 12/2021 | Dasgupta et al. |
| 2021/0398650 | A1 | 12/2021 | Baker et al. |
| 2022/0011731 | A1 | 1/2022 | Risbeck et al. |
| 2022/0051276 | A1 * | 2/2022 | Zelocchi ............... G16H 30/40 |
| 2022/0057099 | A1 | 2/2022 | Clement et al. |
| 2022/0065479 | A1 | 3/2022 | Douglas et al. |
| 2022/0067077 | A1 | 3/2022 | Tupakula et al. |
| 2022/0092500 | A1 | 3/2022 | Drees et al. |
| 2022/0113045 | A1 | 4/2022 | Gamroth et al. |
| 2022/0137575 | A1 | 5/2022 | Paulson et al. |
| 2022/0137580 | A1 | 5/2022 | Burroughs et al. |
| 2022/0171347 | A1 | 6/2022 | Oliver et al. |
| 2022/0237063 | A1 | 7/2022 | Giddings et al. |
| 2022/0245641 | A1 | 8/2022 | Wintle et al. |
| 2022/0284519 | A1 | 9/2022 | Pancholi et al. |
| 2022/0327111 | A1 | 10/2022 | Park et al. |
| 2022/0341609 | A1 | 10/2022 | McNamara et al. |
| 2022/0368558 | A1 | 11/2022 | Ploegert et al. |
| 2022/0381471 | A1 | 12/2022 | Wenzel et al. |
| 2022/0390137 | A1 | 12/2022 | Wenzel et al. |
| 2022/0414300 | A1 | 12/2022 | Odisio et al. |
| 2023/0029218 | A1 | 1/2023 | Bhamidipaty et al. |
| 2023/0042065 | A1 | 2/2023 | Douglas et al. |
| 2023/0061096 | A1 | 3/2023 | Mojtahedzadeh et al. |
| 2023/0085641 | A1 | 3/2023 | Jones et al. |
| 2023/0153490 | A1 | 5/2023 | Lee et al. |
| 2023/0169220 | A1 | 6/2023 | Ramanasankaran et al. |
| 2023/0185983 | A1 | 6/2023 | Ramanasankaran et al. |
| 2023/0206062 | A1 | 6/2023 | Scherwitz |
| 2023/0213909 | A1 | 7/2023 | Galvez et al. |
| 2023/0273576 | A1 | 8/2023 | Douglas et al. |
| 2023/0298371 | A1 | 9/2023 | Rezaeian et al. |
| 2023/0324069 | A1 | 10/2023 | Drees et al. |
| 2023/0342392 | A1 | 10/2023 | McCarson |
| 2023/0358429 | A1 * | 11/2023 | Ramanasankaran ........................ G05B 23/0243 |
| 2023/0367668 | A1 | 11/2023 | Oglesby et al. |
| 2023/0394537 | A1 * | 12/2023 | Ghorbani ............... G06V 10/00 |
| 2023/0418281 | A1 | 12/2023 | Lee et al. |
| 2023/0418524 | A1 | 12/2023 | Darji et al. |
| 2024/0012767 | A1 * | 1/2024 | Ray ..................... G06T 1/20 |
| 2024/0012846 | A1 | 1/2024 | Truong et al. |
| 2024/0104692 | A1 * | 3/2024 | Pottorff ............... G06T 3/4007 |
| 2024/0121254 | A1 | 4/2024 | Gu |

(56) References Cited

U.S. PATENT DOCUMENTS

| | | |
|---|---|---|
| 2024/0176319 A1 | 5/2024 | Risbeck et al. |
| 2024/0256598 A1 | 8/2024 | McCarson |
| 2024/0265047 A1 | 8/2024 | McCarson |

FOREIGN PATENT DOCUMENTS

| | | |
|---|---|---|
| WO | WO-2021/011449 A1 | 1/2021 |
| WO | WO-2021/011464 A1 | 1/2021 |
| WO | WO-2021/011497 A1 | 1/2021 |
| WO | WO-2022/266509 A1 | 12/2022 |

OTHER PUBLICATIONS

U.S. Appl. No. 18/116,974, filed Mar. 3, 2023, Lee et al.
U.S. Appl. No. 18/375,261, filed Sep. 29, 2023, Gupta et al.
U.S. Appl. No. 18/379,561, filed Oct. 12, 2023, Kammela et al.
U.S. Appl. No. 18/419,442, filed Jan. 22, 2024, Brown et al.
U.S. Appl. No. 18/419,449, filed Jan. 22, 2024, Brown et al.
U.S. Appl. No. 18/419,456, filed Jan. 22, 2024, Brown et al.
U.S. Appl. No. 18/419,464, filed Jan. 22, 2024, Ramanasankaran et al.
U.S. Appl. No. 18/438,195, filed Feb. 9, 2024, Lu et al.
U.S. Appl. No. 18/631,678, filed Apr. 10, 2024, Selvaraj et al.
U.S. Appl. No. 18/633,024, filed Apr. 11, 2024, Brown et al.
U.S. Appl. No. 18/633,040, filed Apr. 11, 2024, Brown et al.
U.S. Appl. No. 18/633,049, filed Apr. 11, 2024, Brown et al.
U.S. Appl. No. 18/633,068, filed Apr. 11, 2024, Brown et al.
U.S. Appl. No. 18/633,086, filed Apr. 11, 2024, Brown et al.
U.S. Appl. No. 18/633,097, filed Apr. 11, 2024, Brown et al.
U.S. Appl. No. 18/661,045, filed May 10, 2024, Goyal et al.
U.S. Appl. No. 18/661,057, filed May 10, 2024, Brown et al.
Invitation to Pay Additional Fees on PCT Appl. No. PCT/US2024/024055 dated Jun. 13, 2024 (15 pages).
Giacaglia, G., "How Transformers Work," Towards Data Science, Mar. 10, 2019 (29 pages).
International Search Report and Written Opinion on PCT Appl. No. PCT/US2024/024055 dated Aug. 5, 2024 (21 pages).
Lawton, G., "Generative AI vs. Predictive AI: Understanding the differences," TechTarget, URL: https://www.techtarget.com/searchenterpriseai/tip/Generative-AI-vs-predictive-AI-Understanding-the-differences#:~:text=Predictive%20AI%20forecasts%20future%20events,form%20of%20text%20and%20images, Jul. 12, 2024 (10 pages).

* cited by examiner

BUILDING MANAGEMENT SYSTEM WITH NATURAL LANGUAGE MODEL-BASED DATA STRUCTURE GENERATION

CROSS-REFERENCE TO RELATED APPLICATIONS

This application claims the benefit of and priority to U.S. Provisional Application No. 63/458,871, filed Apr. 12, 2023, U.S. Provisional Application No. 63/466,203, filed May 12, 2023, U.S. Provisional Application No. 63/528,183, filed Jul. 21, 2023, and U.S. Provisional Application No. 63/541,261, filed Sep. 28, 2023, the entire disclosures of which are incorporated by reference herein.

BACKGROUND

This application relates generally to a building system of a building. This application relates more particularly to systems for managing and processing data of the building system.

Various interactions between building systems, components of building systems, users, technicians, and/or devices managed by users or technicians can rely on timely generation and presentation of relevant information relating to user prompts and/or queries. However, it can be difficult and/or cumbersome to generate relevant data in response to the user prompts and/or queries. For example, obtaining relevant information in response to user prompts and/or queries has traditionally required expert analysis or specific query language corresponding to predetermined schema vocabulary.

SUMMARY

One or more aspects relate to building management systems with language model-based data structure generation. For example, a method can include receiving, by one or more processors associated with a building management system, a query to select, from a plurality of data sources of the building management system, a selected one or more data sources according to a characteristic indicated by the query in at least one of a natural language representation or a semantic representation. The method can further include applying, by the one or more processors, the query as input to a machine learning model to cause the machine learning model to generate an output indicating the selected one or more data sources, the machine learning model configured using training data comprising sample data and metadata from the plurality of data sources. The method can further include presenting, by the one or more processors using at least one of a display device or an audio output device, the output.

At least one aspect relates to a method. The method can include retrieving, by one or more processors, from at least one data source coupled with a building management system, a plurality of data elements comprising at least one of sample data regarding one or more items of equipment associated with the building management system or metadata indicative of a definition of the sample data. the method can further include structuring, by the one or more processors according to the at least one of the sample data or the metadata, the plurality of data elements into training data for a machine learning model. The method can further include applying, by the one or more processors as input to the machine learning model, the training data to configure the machine learning model according to the training data.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
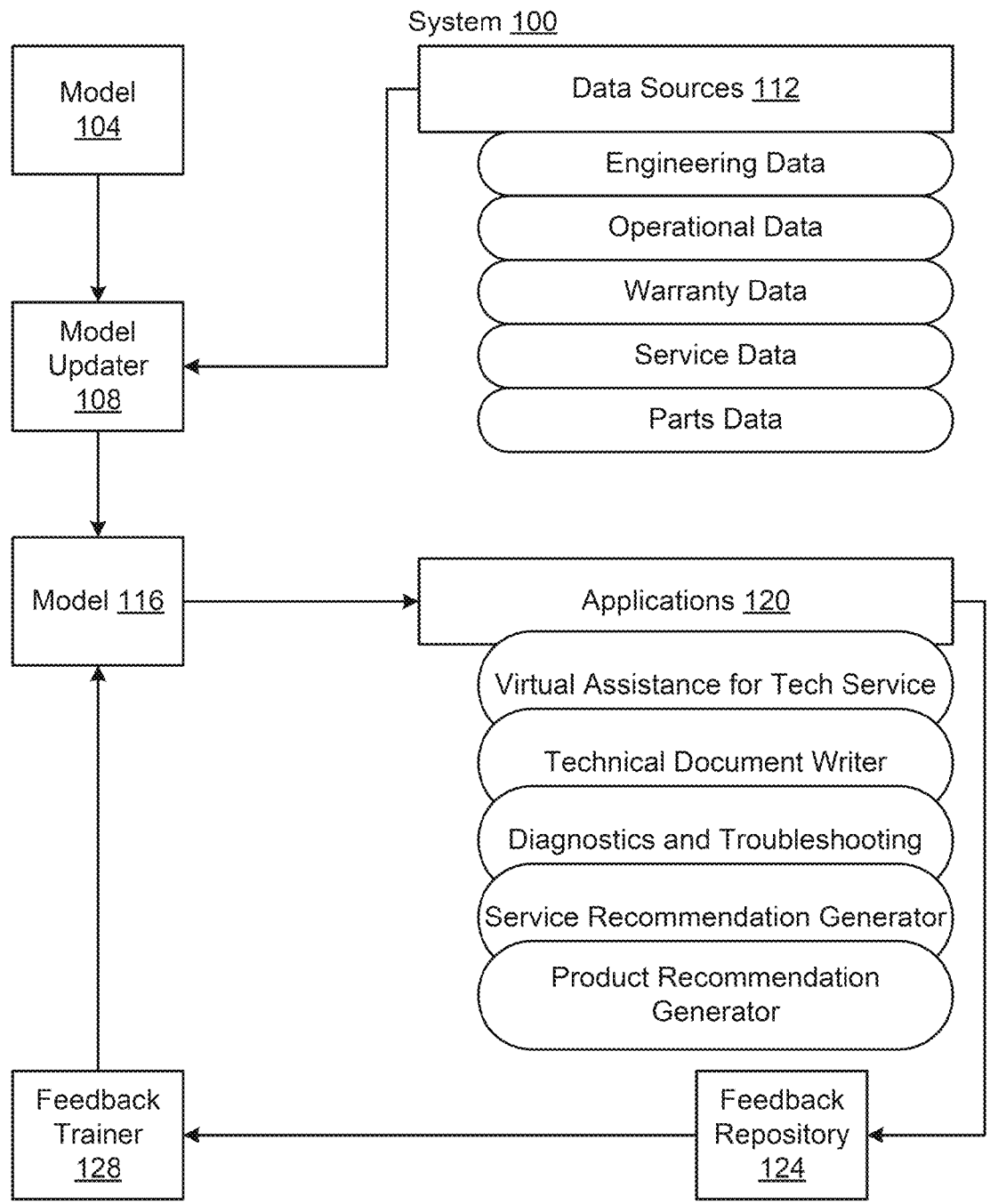
FIG. 1 is a block diagram of an example of a machine learning model-based system.

Referring generally to the FIGURES, systems and methods in accordance with the present disclosure can implement various systems to precisely generate data relating to operations to be performed for managing building systems and components and/or items of equipment, including systems and components of heating, ventilation, cooling, and/or refrigeration (HVAC-R) systems, video monitoring systems, or security systems. For example, various systems described herein can be implemented to generate data more precisely for various applications including, for example and without limitation, virtual assistance for providing information and recommendations pertaining to a building and/or various assets therein in response to user prompts.

AI and/or machine learning (ML) systems, including but not limited to LLMs, can be used to generate text data and data of other modalities in a more responsive manner to real-time conditions, including generating strings of text data that may not be provided in the same manner in existing documents, yet may still meet criteria for useful text information, such as relevance, style, and coherence. For example, LLMs can predict text data based at least on inputted prompts and by being configured (e.g., trained, modified, updated, fine-tuned) according to training data representative of the text data to predict or otherwise generate.

However, various considerations may limit the ability of such systems to precisely generate appropriate data for specific conditions. For example, due to the predictive nature of the generated data, some LLMs may generate text data that is incorrect, imprecise, or not relevant to the specific conditions. Using the LLMs may require a user to manually vary the content and/or syntax of inputs provided to the LLMs (e.g., vary inputted prompts) until the output of the LLMs meets various objective or subjective criteria of the user. The LLMs can have token limits for sizes of inputted text during training and/or runtime/inference operations (and relaxing or increasing such limits may require increased computational processing, API calls to LLM services, and/or memory usage), limiting the ability of the LLMs to be effectively configured or operated using large amounts of raw data or otherwise unstructured data. In some instances, relatively large LLMs, such as LLMs having billions or trillions of parameters, may be less agile in responding to novel queries or applications. In addition, various LLMs may lack transparency, such as to be unable to provide to a user a conceptual/semantic-level explanation of a given output was generated and/or selected relative to other possible outputs.

Systems and methods in accordance with the present disclosure can use machine learning models, including LLMs and other generative AI systems, to capture data, including but not limited to unstructured knowledge from various data sources, and process the data to accurately generate outputs, such as completions responsive to prompts, including in structured data formats for various applications and use cases. The system can implement various automated and/or expert-based thresholds and data quality management processes to improve the accuracy and quality of generated outputs and update training of the machine learning models accordingly. The system can enable real-time messaging and/or conversational interfaces for users to input various user prompts and receive corresponding informational completions via machine learning models trained using building knowledge graph data that is translated into natural language text prompts.

Systems and methods in accordance with the present disclosure can leverage the efficiency of language models (e.g., GPT-based models or other pre-trained LLMs) in extracting semantic information (e.g., semantic information identifying building entities, types of building entities, relationships between building entities) from the unstructured data in order to generate more accurate outputs regarding various building entities. As such, by implementing language models using various operations and processes described herein, building management systems can take advantage of the causal/semantic associations between the unstructured data and the data relating to various building entities, and the language models can allow these systems to extract these relationships more efficiently in order to more accurately predict targeted, useful information at inference-time/runtime. While various implementations are described as being implemented using generative AI models such as transformers and/or GANs, in some embodiments, various features described herein can be implemented using non-generative AI models or even without using AI/machine learning, and all such modifications fall within the scope of the present disclosure.

In various implementations, the systems can include a plurality of machine learning models that may be configured using integrated or disparate data sources. This can facilitate more integrated user experiences or more specialized (and/or lower computational usage for) data processing and output generation. Outputs from one or more first systems, such as one or more first algorithms or machine learning models, can be provided at least as part of inputs to one or more second systems, such as one or more second algorithms or machine learning models. For example, a first language model can be configured to process unstructured inputs (e.g., text, speech, images, etc.) into a structure output format compatible for use by a second system, such as to provide relevant information pertaining to one or more assets within a building.

The systems and methods described herein utilize language models trained or otherwise fine-tuned using building knowledge graph data to allow for accurate ask-me-anything type chat bots (or other information request applications) to be created that have a variety of benefits over traditional building information request systems. For example, by training or otherwise fine-tuning language models using building knowledge graph data, natural language questions can be provided by users, thereby eliminating the need for users to learn specified query language. Further, because the language models are already pre-trained with a large amount of general data, the building knowledge graph data can be used to quickly fine-tune the language models without needing a large or expansive data set specifically related to the building.

I. Machine Learning Models for Building Management Systems

FIG. 1 depicts an example of a system 100. The system 100 can implement various operations for configuring (e.g., training, updating, modifying, transfer learning, fine-tuning, etc.) and/or operating various AI and/or ML systems, such as neural networks of LLMs or other generative AI systems. The system 100 can be used to implement various generative AI-based building equipment operations.

For example, the system 100 can be implemented for operations associated with any of a variety of building management systems (BMSs) or equipment or components thereof. A BMS can include a system of devices that can control, monitor, and manage equipment in or around a building or building area. The BMS can include, for example, a HVAC system, a security system, a video monitoring system, a lighting system, a fire alerting system, any other system that is capable of managing building functions or devices, or any combination thereof. The BMS can include or be coupled with items of equipment, for example and without limitation, such as heaters, chillers, boilers, air handling units, sensors, actuators, refrigeration systems, fans, blowers, heat exchangers, energy storage devices, condensers, valves, or various combinations thereof.

The items of equipment can operate in accordance with various qualitative and quantitative parameters, variables, setpoints, and/or thresholds or other criteria, for example. In some instances, the system 100 and/or the items of equipment can include or be coupled with one or more controllers for controlling parameters of the items of equipment, such as to receive control commands for controlling operation of the items of equipment via one or more wired, wireless, and/or user interfaces of controller.

Various components of the system 100 or portions thereof can be implemented by one or more processors coupled with one or more memory devices (memory). The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors can be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources.

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

Machine Learning Models

The system 100 can include or be coupled with one or more first models 104. The first model 104 can include one or more neural networks, including neural networks configured as generative models. For example, the first model 104 can predict or generate new data (e.g., artificial data; synthetic data; data not explicitly represented in data used for configuring the first model 104). The first model 104 can generate any of a variety of modalities of data, such as text, speech, audio, images, and/or video data. The neural network can include a plurality of nodes, which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first model 104 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first model 104 can include at least one GPT model. The GPT model can receive an input sequence, and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer based operations or networks to the modified input sequence to identify relationships between tokens for detecting the next token to form the output sequence.

The first model 104 can include at least one diffusion model, which can be used to generate image and/or video data. For example, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first model 104 includes a plurality of generative models, such as GPT and diffusion models, that can be trained separately or jointly to facilitate generating multi-modal outputs, such as technical documents (e.g., service guides) that include both text and image/video information.

In some implementations, the first model 104 can be configured using various unsupervised and/or supervised training operations. The first model 104 can be configured using training data from various domain-agnostic and/or domain-specific data sources, including but not limited to various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring the first model 104 to perform clustering, classification, or other unsupervised ML operations). The training data can include human-labeled information, including but not limited to feedback regarding outputs of the models 104, 116. This can allow the system 100 to generate more human-like outputs.

In some implementations, the training data includes data relating to building management systems. For example, the training data can include examples of HVAC-R data, such as operating manuals, technical data sheets, configuration settings, operating setpoints, diagnostic guides, troubleshooting guides, user reports, technician reports. In some implementations, the training data used to configure the first model 104 includes at least some publicly accessible data, such as data retrievable via the Internet.

Referring further to FIG. 1, the system 100 can configure the first model 104 to determine one or more second models 116. For example, the system 100 can include a model updater 108 that configures (e.g., trains, updates, modifies, fine-tunes, etc.) the first model 104 to determine the one or more second models 116. In some implementations, the second model 116 can be used to provide application-specific outputs, such as outputs having greater precision, accuracy, or other metrics, relative to the first model, for targeted applications.

The second model 116 can be similar to the first model 104. For example, the second model 116 can have a similar or identical backbone or neural network architecture as the first model 104. In some implementations, the first model 104 and the second model 116 each include generative AI machine learning models, such as LLMs (e.g., GPT-based LLMs) and/or diffusion models. The second model 116 can be configured using processes analogous to those described for configuring the first model 104.

In some implementations, the model updater 108 can perform operations on at least one of the first model 104 or the second model 116 via one or more interfaces, such as application programming interfaces (APIs). For example, the models 104, 116 can be operated and maintained by one or more systems separate from the system 100. The model updater 108 can provide training data to the first model 104, via the API, to determine the second model 116 based on the first model 104 and the training data. The model updater 108 can control various training parameters or hyperparameters (e.g., learning rates, etc.) by providing instructions via the API to manage configuring the second model 116 using the first model 104.

Data Sources

The model updater 108 can determine the second model 116 using data from one or more data sources 112. For example, the system 100 can determine the second model 116 by modifying the first model 104 using data from the one or more data sources 112. The data sources 112 can include or be coupled with any of a variety of integrated or disparate databases, data warehouses, digital twin data structures (e.g., digital twins of items of equipment or building management systems or portions thereof), data lakes, data repositories, documentation records, or various combinations thereof. In some implementations, the data sources 112 include HVAC-R data in any of text, speech, audio, image, or video data, or various combinations thereof, such as data associated with HVAC-R components and procedures including but not limited to installation, operation, configuration, repair, servicing, diagnostics, and/or troubleshooting of HVAC-R components and systems. Various data described below with reference to data sources 112 may be provided in the same or different data elements, and may be updated at various points. The data sources 112 can include or be coupled with items of equipment (e.g., where the items of equipment output data for the data sources 112, such as sensor data, etc.). The data sources 112 can include various online and/or social media sources, such as blog posts or data submitted to applications maintained by entities that manage the buildings. The system 100 can determine relations between data from different sources, such as by using timeseries information and identifiers of the sites or buildings at which items of equipment are present to detect relationships between various different data relating to the items of equipment (e.g., to train the models 104, 116 using both timeseries data (e.g., sensor data; outputs of algorithms or models, etc.) regarding a given item of equipment and freeform natural language reports regarding the given item of equipment).

The data sources 112 can include unstructured data or structured data (e.g., data that is labeled with or assigned to one or more predetermined fields or identifiers, or is in a predetermined format, such as a database or tabular format). The unstructured data can include one or more data elements that are not in a predetermined format (e.g., are not assigned to fields, or labeled with or assigned with identifiers, that are indicative of a characteristic of the one or more data elements). The data sources 112 can include semi-structured data, such as data assigned to one or more fields that may not specify at least some characteristics of the data, such as data represented in a report having one or more fields to which freeform data is assigned (e.g., a report having a field labeled "describe the item of equipment" in which text or user input describing the item of equipment is provided). The data sources 112 can include data that is incomplete, For example, using the first model 104 and/or second model 116 to process the data can allow the system 100 to extract useful information from data in a variety of formats, including unstructured/freeform formats, which can allow service technicians to input information in less burdensome formats. The data can be of any of a plurality of formats (e.g., text, speech, audio, image, video, etc.), including multi-modal formats. For example, the data may be received from service technicians in forms such as text (e.g., laptop/desktop or mobile application text entry), audio, and/or video (e.g., dictating findings while capturing video).

The data sources 112 can include engineering data regarding one or more items of equipment. The engineering data can include manuals, such as installation manuals, instruction manuals, or operating procedure guides. The engineering data can include specifications or other information regarding operation of items of equipment. The engineering data can include engineering drawings, process flow diagrams, refrigeration cycle parameters (e.g., temperatures, pressures), or various other information relating to locations, installations, structures, and functions of items of equipment.

In some implementations, the data sources 112 can include operational data regarding one or more items of equipment. The operational data can represent detected information regarding items of equipment, such as sensor data, logged data, user reports, or technician reports. The operational data can include, for example, service tickets generated responsive to requests for service, work orders, data from digital twin data structures maintained by an entity of the item of equipment, outputs or other information from equipment operation models (e.g., chiller vibration models), or various combinations thereof. Logged data, user reports, service tickets, billing records, time sheets, and various other such data can provide temporal information, such as how long service operations may take, or durations of time between service operations, which can allow the system 100 to predict resources to use for performing service as well as when to request service.

The data sources 112 can include, for instance, warranty data. The warranty data can include warranty documents or agreements that indicate conditions under which various entities associated with items of equipment are to provide service, repair, or other actions corresponding to items of equipment, such as actions corresponding to service requests.

The data sources 112 can include service data. The service data can include data from any of various service providers, such as service reports. The service data can indicate service procedures performed, including associated service procedures with initial service requests and/or sensor data related conditions to trigger service and/or sensor data measured during service processes.

In some implementations, the data sources 112 can include parts data, including but not limited to parts usage and sales data. For example, the data sources 112 can indicate various parts associated with installation or repair of items of equipment. The data sources 112 can indicate tools for performing service and/or installing parts.

The system 100 can include, with the data of the data sources 112, labels to facilitate cross-reference between items of data that may relate to common items of equipment, sites, service technicians, customers, or various combinations thereof. For example, data from disparate sources may be labeled with time data, which can allow the system 100 (e.g., by configuring the models 104, 116) to increase a likelihood of associating information from the disparate sources due to the information being detected or recorded (e.g., as service reports) at the same time or near in time.

For example, the data sources 112 can include data that can be particular to specific or similar items of equipment, buildings, equipment configurations, environmental states, or various combinations thereof. In some implementations, the data includes labels or identifiers of such information, such as to indicate locations, weather conditions, timing information, uses of the items of equipment or the buildings or sites at which the items of equipment are present, etc. This can enable the models 104, 116 to detect patterns of usage (e.g., spikes; troughs; seasonal or other temporal patterns) or other information that may be useful for determining causes of issues or causes of service requests, or predict future issues, such as to allow the models 104, 116 to be trained using information indicative of causes of issues across multiple items of equipment (which may have the same or similar causes even if the data regarding the items of equipment is not identical). For example, an item of equipment may be at a site that is a museum; by relating site usage or occupancy data with data regarding the item of equipment, such as sensor data and service reports, the system 100 can configure the models 104, 116 to determine a high likelihood of issues occurring before events associated with high usage (e.g., gala, major exhibit opening), and can generate recommendations to perform diagnostics or servicing prior to the events.

Model Configuration

Referring further to FIG. 1, the model updater 108 can perform various machine learning model configuration/training operations to determine the second models 116 using the data from the data sources 112. For example, the model updater 108 can perform various updating, optimization, retraining, reconfiguration, fine-tuning, or transfer learning operations, or various combinations thereof, to determine the second models 116. The model updater 108 can configure the second models 116, using the data sources 112, to generate outputs (e.g., completions) in response to receiving inputs (e.g., prompts), where the inputs and outputs can be analogous to data of the data sources 112.

For example, the model updater 108 can identify one or more parameters (e.g., weights and/or biases) of one or more layers of the first model 104, and maintain (e.g., freeze, maintain as the identified values while updating) the values of the one or more parameters of the one or more layers. In some implementations, the model updater 108 can modify the one or more layers, such as to add, remove, or change an output layer of the one or more layers, or to not maintain the values of the one or more parameters. The model updater 108 can select at least a subset of the identified one or parameters to maintain according to various criteria, such as user input or other instructions indicative of an extent to which the first model 104 is to be modified to determine the second model 116. In some implementations, the model updater 108 can modify the first model 104 so that an output layer of the first model 104 corresponds to output to be determined for applications 120.

Responsive to selecting the one or more parameters to maintain, the model updater 108 can apply, as input to the second model 116 (e.g., to a candidate second model 116, such as the modified first model 104, such as the first model 104 having the identified parameters maintained as the identified values), training data from the data sources 112. For example, the model updater 108 can apply the training data as input to the second model 116 to cause the second model 116 to generate one or more candidate outputs.

The model updater 108 can evaluate a convergence condition to modify the candidate second model 116 based at least on the one or more candidate outputs and the training data applied as input to the candidate second model 116. For example, the model updater 108 can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second model 116 correspond to the ground truth represented by the training data. The model updater 108 can use any of a variety of optimization algorithms (e.g., gradient descent, stochastic descent, Adam optimization, etc.) to modify one or more parameters (e.g., weights or biases of the layer(s) of the candidate second model 116 that are not frozen) of the candidate second model 116 according to the evaluation of the objective function. In some implementations, the model updater 108 can use various hyperparameters to evaluate the convergence condition and/or perform the configuration of the candidate second model 116 to determine the second model 116, including but not limited to hyperparameters such as learning rates, numbers of iterations or epochs of training, etc.

As described further herein with respect to applications 120, in some implementations, the model updater 108 can select the training data from the data of the data sources 112 to apply as the input based at least on a particular application of the plurality of applications 120 for which the second model 116 is to be used for. For example, the model updater 108 can select data from the parts data source 112 for the product recommendation generator application 120, or select various combinations of data from the data sources 112 (e.g., engineering data, operational data, and service data) for the service recommendation generator application 120. The model updater 108 can apply various combinations of data from various data sources 112 to facilitate configuring the second model 116 for one or more applications 120.

In some implementations, the system 100 can perform at least one of conditioning, classifier-based guidance, or classifier-free guidance to configure the second model 116 using the data from the data sources 112. For example, the system 100 can use classifiers associated with the data, such as identifiers of the item of equipment, a type of the item of equipment, a type of entity operating the item of equipment, a site at which the item of equipment is provided, or a history of issues at the site, to condition the training of the second model 116. For example, the system 100 combine (e.g., concatenate) various such classifiers with the data for inputting to the second model 116 during training, for at least a subset of the data used to configure the second model 116, which can enable the second model 116 to be responsive to analogous information for runtime/inference time operations.

Applications

Referring further to FIG. 1, the system 100 can use outputs of the one or more second models 116 to implement one or more applications 120. For example, the second models 116, having been configured using data from the data sources 112, can be capable of precisely generating outputs that represent useful, timely, and/or real-time information for the applications 120. In some implementations, each application 120 is coupled with a corresponding second model 116 that is specifically configured to generate outputs for use by the application 120. Various applications 120 can be coupled with one another, such as to provide outputs from a first application 120 as inputs or portions of inputs to a second application 120.

The applications 120 can include any of a variety of desktop, web-based/browser-based, or mobile applications. For example, the applications 120 can be implemented by enterprise management software systems, employee or other user applications (e.g., applications that relate to BMS functionality such as temperature control, user preferences, conference room scheduling, etc.), equipment portals that provide data regarding items of equipment, or various combinations thereof.

The applications 120 can include user interfaces, dashboards, wizards, checklists, conversational interfaces, chatbots, configuration tools, or various combinations thereof. The applications 120 can receive an input, such as a prompt (e.g., from a user), provide the prompt to the second model 116 to cause the second model 116 to generate an output, such as a completion in response to the prompt, and present an indication of the output. The applications 120 can receive inputs and/or present outputs in any of a variety of presentation modalities, such as text, speech, audio, image, and/or video modalities. For example, the applications 120 can receive unstructured or freeform inputs from a user, such as a service technician, and generate reports in a standardized format, such as a customer-specific format. This can allow, for example, technicians to automatically, and flexibly, generate customer-ready reports after service visits without requiring strict input by the technician or manually sitting down and writing reports; to receive inputs as dictations in order to generate reports; to receive inputs in any form or a variety of forms, and use the second model 116 (which can be trained to cross-reference metadata in different portions of inputs and relate together data elements) to generate output reports (e.g., the second model 116, having been configured with data that includes time information, can use timestamps of input from dictation and timestamps of when an image is taken, and place the image in the report in a target position or label based on time correlation).

In some implementations, the applications 120 include at least one virtual assistant (e.g., virtual assistance for technician services) application 120. The virtual assistant application can provide various services to support technician operations, such as presenting information from service requests, receiving queries regarding actions to perform to service items of equipment, and presenting responses indicating actions to perform to service items of equipment. The virtual assistant application can receive information regarding an item of equipment to be serviced, such as sensor data, text descriptions, or camera images, and process the received information using the second model 116 to generate corresponding responses.

For example, the virtual assistant application 120 can be implemented in a UI/UX wizard configuration, such as to provide a sequence of requests for information from the user (the sequence may include requests that are at least one of predetermined or dynamically generated responsive to inputs from the user for previous requests). For example, the virtual assistant application 120 can provide one or more requests for information from users such as service technicians, facility managers, or other occupants, and provide the received responses to at least one of the second model 116 or a root cause detection function (e.g., algorithm, model, data structure mapping inputs to candidate causes, etc.) to determine a prediction of a cause of the issue of the item of equipment and/or solutions. The virtual assistant application 120 can use requests for information such as for unstructured text by which the user describes characteristics of the item of equipment relating to the issue; answers expected to correspond to different scenarios indicative of the issue; and/or image and/or video input (e.g., images of problems, equipment, spaces, etc. that can provide more context around the issue and/or configurations). For example, responsive to receiving a response via the virtual assistant application 120 indicating that the problem is with temperature in the space, the system 100 can request, via the virtual assistant application 120, information regarding HVAC-R equipment associated with the space, such as pictures of the space, an air handling unit, a chiller, or various combinations thereof.

The virtual assistant application 120 can include a plurality of applications 120 (e.g., variations of interfaces or customizations of interfaces) for a plurality of respective user types. For example, the virtual assistant application 120 can include a first application 120 for a customer user, and a second application 120 for a service technician user. The virtual assistant applications 120 can allow for updating and other communications between the first and second applications 120 as well as the second model 116. Using one or more of the first application 120 and the second application 120, the system 100 can manage continuous/real-time conversations for one or more users, and evaluate the users' engagement with the information provided (e.g., did the user, customer, service technician, etc., follow the provided steps for responding to the issue or performing service, did the user discontinue providing inputs to the virtual assistant application 120, etc.), such as to enable the system 100 to update the information generated by the second model 116 for the virtual assistant application 120 according to the engagement. In some implementations, the system 100 can use the second model 116 to detect sentiment of the user of the virtual assistant application 120, and update the second model 116 according to the detected sentiment, such as to improve the experience provided by the virtual assistant application 120.

The applications 120 can include at least one document writer application 120, such as a technical document writer. The document writer application 120 can facilitate preparing structured (e.g. form-based) and/or unstructured documentation, such as documentation associated with service requests. For example, the document writer application 120 can present a user interface corresponding to a template document to be prepared that is associated with at least one of a service request or the item of equipment for which the service request is generated, such as to present one or more predefined form sections or fields. The document writer application 120 can use inputs, such as prompts received from the users and/or technical data provided by the user regarding the item of equipment, such as sensor data, text descriptions, or camera images, to generate information to include in the documentation. For example, the document writer application 120 can provide the inputs to the second model 116 to cause the second model 116 to generate completions for text information to include in the fields of the documentation.

The applications 120 can include, in some implementations, at least one diagnostics and troubleshooting application 120. The diagnostics and troubleshooting application 120 can receive inputs including at least one of a service request or information regarding the item of equipment to be serviced, such as information identified by a service technician. The diagnostics and troubleshooting application 120 can provide the inputs to a corresponding second model 116 to cause the second model 116 to generate outputs such as indications of potential items to be checked regarding the item of equipment, modifications or fixes to make to perform the service, or values or ranges of values of parameters of the item of equipment that may be indicative of specific issues to for the service technician to address or repair.

The applications 120 can at least one service recommendation generator application 120. The service recommendation generator application 120 can receive inputs such as a service request or information regarding the item of equipment to be serviced, and provide the inputs to the second model 116 to cause the second model 116 to generate outputs for presenting service recommendations, such as actions to perform to address the service request.

In some implementations, the applications 120 can include a product recommendation generator application 120. The product recommendation generator application 120 can process inputs such as information regarding the item of equipment or the service request, using one or more second models 116 (e.g., models trained using parts data from the data sources 112), to determine a recommendation of a part or product to replace or otherwise use for repairing the item of equipment.

Feedback Training

Referring further to FIG. 1, the system 100 can include at least one feedback trainer 128 coupled with at least one feedback repository 124. The system 100 can use the feedback trainer 128 to increase the precision and/or accuracy of the outputs generated by the second models 116 according to feedback provided by users of the system 100 and/or the applications 120.

The feedback repository 124 can include feedback received from users regarding output presented by the applications 120. For example, for at least a subset of outputs presented by the applications 120, the applications 120 can present one or more user input elements for receiving feedback regarding the outputs. The user input elements can include, for example, indications of binary feedback regarding the outputs (e.g., good/bad feedback; feedback indicating the outputs do or do not meet the user's criteria, such as criteria regarding technical accuracy or precision); indications of multiple levels of feedback (e.g., scoring the outputs on a predetermined scale, such as a 1-5 scale or 1-10 scale); freeform feedback (e.g., text or audio feedback); or various combinations thereof.

The system 100 can store and/or maintain feedback in the feedback repository 124. In some implementations, the system 100 stores the feedback with one or more data elements associated with the feedback, including but not limited to the outputs for which the feedback was received, the second model(s) 116 used to generate the outputs, and/or input information used by the second models 116 to generate the outputs (e.g., service request information; information captured by the user regarding the item of equipment).

The feedback trainer 128 can update the one or more second models 116 using the feedback. The feedback trainer 128 can be similar to the model updater 108. In some implementations, the feedback trainer 128 is implemented by the model updater 108; for example, the model updater 108 can include or be coupled with the feedback trainer 128. The feedback trainer 128 can perform various configuration operations (e.g., retraining, fine-tuning, transfer learning, etc.) on the second models 116 using the feedback from the feedback repository 124. In some implementations, the feedback trainer 128 identifies one or more first parameters of the second model 116 to maintain as having predetermined values (e.g., freeze the weights and/or biases of one or more first layers of the second model 116), and performs a training process, such as a fine tuning process, to configure parameters of one or more second parameters of the second model 116 using the feedback (e.g., one or more second layers of the second model 116, such as output layers or output heads of the second model 116).

In some implementations, the system 100 may not include and/or use the model updater 108 (or the feedback trainer 128) to determine the second models 116. For example, the system 100 can include or be coupled with an output processor (e.g., an output processor similar or identical to accuracy checker 316 described with reference to FIG. 3) that can evaluate and/or modify outputs from the first model 104 prior to operation of applications 120, including to perform any of various post-processing operations on the output from the first model 104. For example, the output processor can compare outputs of the first model 104 with data from data sources 112 to validate the outputs of the first model 104 and/or modify the outputs of the first model 104 (or output an error) responsive to the outputs not satisfying a validation condition.

Connected Machine Learning Models

Referring further to FIG. 1, the second model 116 can be coupled with one or more third models, functions, or algorithms for training/configuration and/or runtime operations. The third models can include, for example and without limitation, any of various models relating to items of equipment, such as energy usage models, sustainability models, carbon models, air quality models, or occupant comfort models. For example, the second model 116 can be used to process unstructured information regarding items of equipment into predefined template formats compatible with various third models, such that outputs of the second model 116 can be provided as inputs to the third models; this can allow more accurate training of the third models, more training data to be generated for the third models, and/or more data available for use by the third models. The second model 116 can receive inputs from one or more third models, which can provide greater data to the second model 116 for processing.

Automated Service Scheduling and Provisioning

The system 100 can be used to automate operations for scheduling, provisioning, and deploying service technicians and resources for service technicians to perform service operations. For example, the system 100 can use at least one of the first model 104 or the second model 116 to determine, based on processing information regarding service operations for items of equipment relative to completion criteria for the service operation, particular characteristics of service operations such as experience parameters of scheduled service technicians, identifiers of parts provided for the service operations, geographical data, types of customers, types of problems, or information content provided to the service technicians to facilitate the service operation, where such characteristics correspond to the completion criteria being satisfied (e.g., where such characteristics correspond to an increase in likelihood of the completion criteria being satisfied relative to other characteristics for service technicians, parts, information content, etc.). For example, the system 100 can determine, for a given item of equipment, particular parts to include on a truck to be sent to the site of the item of equipment. As such, the system 100, responsive to processing inputs at runtime such as service requests, can automatically and more accurately identify service technicians and parts to direct to the item of equipment for the service operations. The system 100 can use timing information to perform batch scheduling for multiple service operations and/or multiple technicians for the same or multiple service operations. The system 100 can perform batch scheduling for multiple trucks for multiple items of equipment, such as to schedule a first one or more parts having a greater likelihood for satisfying the completion criteria for a first item of equipment on a first truck, and a second one or more parts having a greater likelihood for satisfying the completion criteria for a second item of equipment on a second truck.

Figure 2:
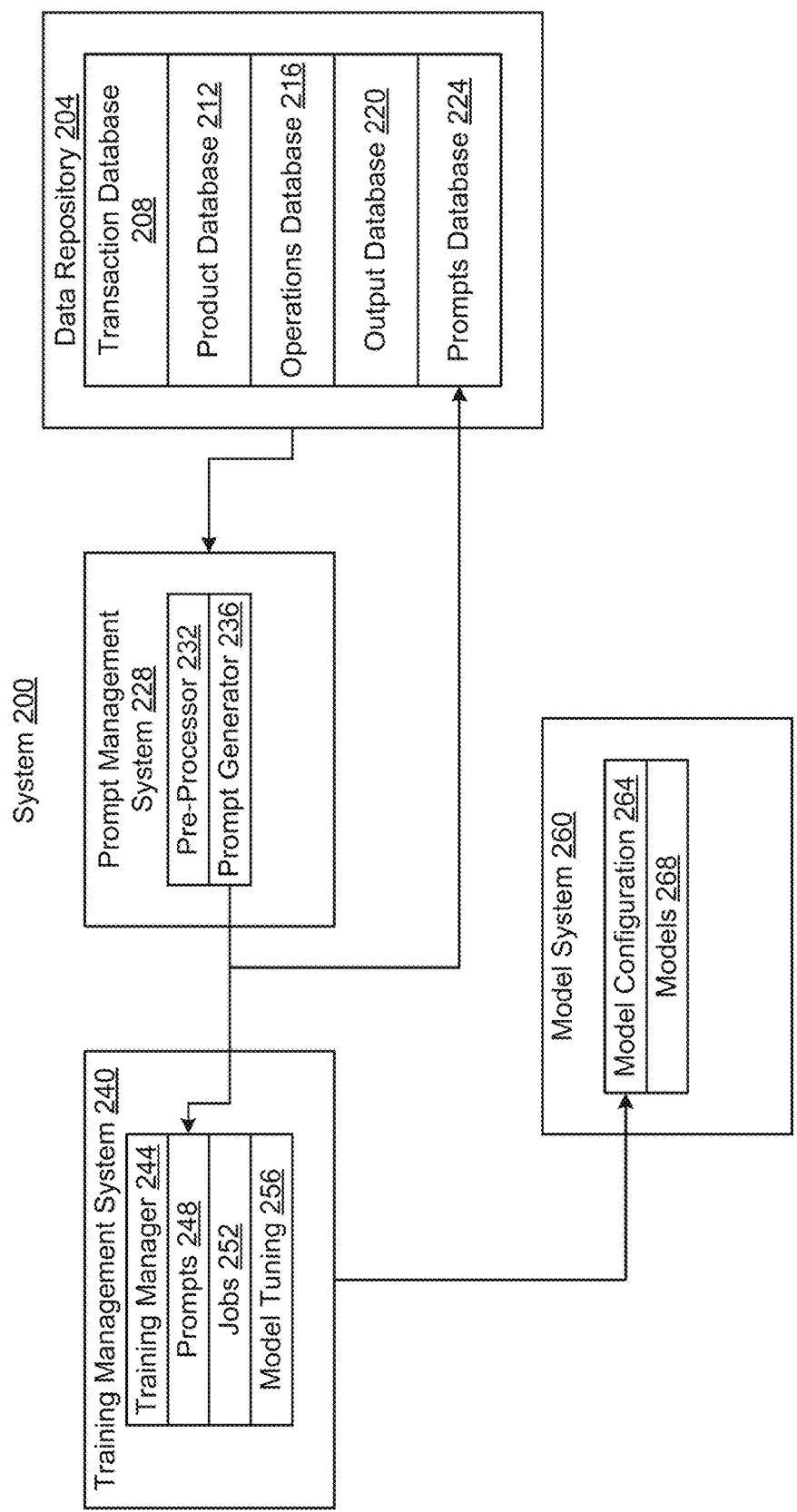
FIG. 2 is a block diagram of an example of a language model-based system.

II. System Architectures for Generative AI Applications for Building Management System and Equipment Servicing FIG. 2 depicts an example of a system 200. The system 200 can include one or more components or features of the system 100, such as any one or more of the first model 104, data sources 112, second model 116, applications 120, feedback repository 124, and/or feedback trainer 128. The system 200 can perform specific operations to enable generative AI applications for building managements systems and equipment servicing, such as various manners of processing input data into training data (e.g., tokenizing input data; forming input data into prompts and/or completions), and managing training and other machine learning model configuration processes. Various components of the system 200 can be implemented using one or more computer systems, which may be provided on the same or different processors (e.g., processors communicatively coupled via wired and/or wireless connections).

The system 200 can include at least one data repository 204, which can be similar to the data sources 112 described with reference to FIG. 1. For example, the data repository 204 can include a transaction database 208, which can be similar or identical to one or more of warranty data or service data of data sources 112. For example, the transaction database 208 can include data such as parts used for service transactions; sales data indicating various service transactions or other transactions regarding items of equipment; warranty and/or claims data regarding items of equipment; and service data.

The data repository 204 can include a product database 212, which can be similar or identical to the parts data of the data sources 112. The product database 212 can include, for example, data regarding products available from various vendors, specifications or parameters regarding products, and indications of products used for various service operations. The products database 212 can include data such as events or alarms associated with products; logs of product operation; and/or time series data regarding product operation, such as longitudinal data values of operation of products and/or building equipment.

The data repository 204 can include an operations database 216, which can be similar or identical to the operations data of the data sources 112. For example, the operations database 216 can include data such as manuals regarding parts, products, and/or items of equipment; customer service data; and or reports, such as operation or service logs.

In some implementations, the data repository 204 can include an output database 220, which can include data of outputs that may be generated by various machine learning models and/or algorithms. For example, the output database 220 can include values of pre-calculated predictions and/or insights, such as parameters regarding operation items of equipment, such as setpoints, changes in setpoints, flow rates, control schemes, identifications of error conditions, or various combinations thereof.

As depicted in FIG. 2, the system 200 can include a prompt management system 228. The prompt management system 228 can include one or more rules, heuristics, logic, policies, algorithms, functions, machine learning models, neural networks, scripts, or various combinations thereof to perform operations including processing data from data repository 204 into training data for configuring various machine learning models. For example, the prompt management system 228 can retrieve and/or receive data from the data repository 228, and determine training data elements that include examples of input and outputs for generation by machine learning models, such as a training data element that includes a prompt and a completion corresponding to the prompt, based on the data from the data repository 228.

In some implementations, the prompt management system 228 includes a pre-processor 232. The pre-processor 232 can perform various operations to prepare the data from the data repository 204 for prompt generation. For example, the pre-processor 232 can perform any of various filtering, compression, tokenizing, or combining (e.g., combining data from various databases of the data repository 204) operations.

The prompt management system 228 can include a prompt generator 236. The prompt generator 236 can generate, from data of the data repository 204, one or more training data elements that include a prompt and a completion corresponding to the prompt. In some implementations, the prompt generator 236 receives user input indicative of prompt and completion portions of data. For example, the user input can indicate template portions representing prompts of structured data, such as predefined fields or forms of documents, and corresponding completions provided for the documents. The user input can assign prompts to unstructured data. In some implementations, the prompt generator 236 automatically determines prompts and completions from data of the data repository 204, such as by using any of various natural language processing algorithms to detect prompts and completions from data. In some implementations, the system 200 does not identify distinct prompts and completions from data of the data repository 204.

Referring further to FIG. 2, the system 200 can include a training management system 240. The training management system 240 can include one or more rules, heuristics, logic, policies, algorithms, functions, machine learning models, neural networks, scripts, or various combinations thereof to perform operations including controlling training of machine learning models, including performing fine tuning and/or transfer learning operations.

The training management system 240 can include a training manager 244. The training manager 244 can incorporate features of at least one of the model updater 108 or the feedback trainer 128 described with reference to FIG. 1. For example, the training manager 244 can provide training data including a plurality of training data elements (e.g., prompts and corresponding completions) to the model system 260 as described further herein to facilitate training machine learning models.

In some implementations, the training management system 240 includes a prompts database 248. For example, the training management system 240 can store one or more training data elements from the prompt management system 228, such as to facilitate asynchronous and/or batched training processes.

The training manager 244 can control the training of machine learning models using information or instructions maintained in a model tuning database 256. For example, the training manager 244 can store, in the model tuning database 256, various parameters or hyperparameters for models and/or model training.

In some implementations, the training manager 244 stores a record of training operations in a jobs database 252. For example, the training manager 244 can maintain data such as a queue of training jobs, parameters or hyperparameters to be used for training jobs, or information regarding performance of training.

Referring further to FIG. 2, the system 200 can include at least one model system 260 (e.g., one or more language model systems). The model system 260 can include one or more rules, heuristics, logic, policies, algorithms, functions, machine learning models, neural networks, scripts, or various combinations thereof to perform operations including configuring one or more machine learning models 268 based on instructions from the training management system 240. In some implementations, the training management system 240 implements the model system 260. In some implementations, the training management system 240 can access the model system 260 using one or more APIs, such as to provide training data and/or instructions for configuring machine learning models 268 via the one or more APIs. The model system 260 can operate as a service layer for configuring the machine learning models 268 responsive to instructions from the training management system 240. The machine learning models 268 can be or include the first model 104 and/or second model 116 described with reference to FIG. 1.

The model system 260 can include a model configuration processor 264. The model configuration processor 264 can incorporate features of the model updater 108 and/or the feedback trainer 128 described with reference to FIG. 1. For example, the model configuration processor 264 can apply training data (e.g., prompts 248 and corresponding completions) to the machine learning models 268 to configure (e.g., train, modify, update, fine-tune, etc.) the machine learning models 268. The training manager 244 can control training by the model configuration processor 264 based on model tuning parameters in the model tuning database 256, such as to control various hyperparameters for training. In various implementations, the system 200 can use the training management system 240 to configure the machine learning models 268 in a similar manner as described with reference to the second model 116 of FIG. 1, such as to train the machine learning models 268 using any of various data or combinations of data from the data repository 204.

Application Session Management

Figure 3:
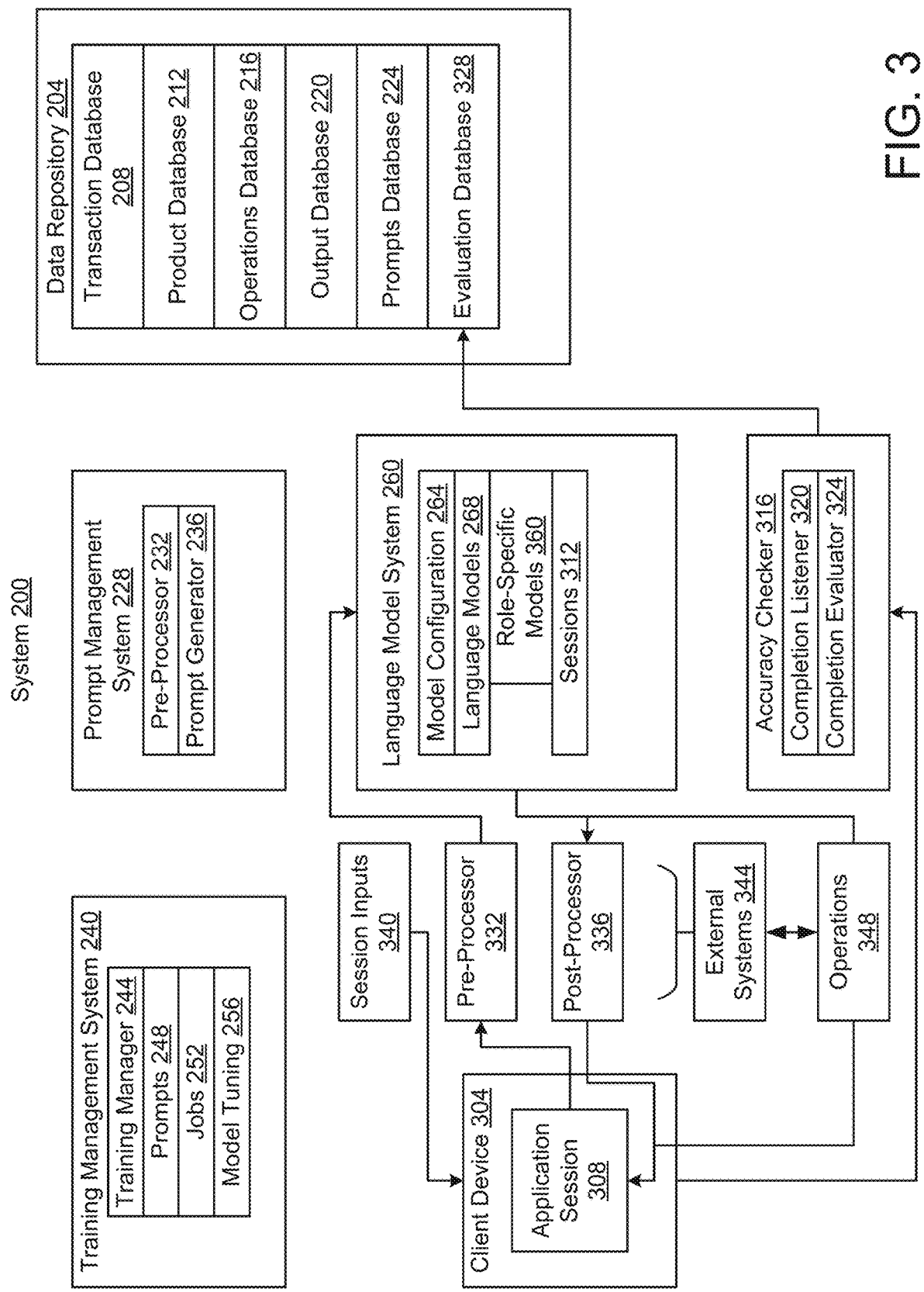
FIG. 3 is a block diagram of an example of the system of FIG. 2 including user application session components.

FIG. 3 depicts an example of the system 200, in which the system 200 can perform operations to implement at least one application session 308 for a client device 304. For example, responsive to configuring the machine learning models 268, the system 200 can generate data for presentation by the client device 304 (including generating data responsive to information received from the client device 304) using the at least one application session 308 and the one or more machine learning models 268.

The client device 304 can be a device of a user, such as a technician or building manager. The client device 304 can include any of various wireless or wired communication interfaces to communicate data with the model system 260, such as to provide requests to the model system 260 indicative of data for the machine learning models 268 to generate, and to receive outputs from the model system 260. The client device 304 can include various user input and output devices to facilitate receiving and presenting inputs and outputs.

In some implementations, the system 200 provides data to the client device 304 for the client device 304 to operate the at least one application session 308. The application session 308 can include a session corresponding to any of the applications 120 described with reference to FIG. 1. For example, the client device 304 can launch the application session 308 and provide an interface to request one or more prompts. Responsive to receiving the one or more prompts, the application session 308 can provide the one or more prompts as input to the machine learning model 268. The machine learning model 268 can process the input to generate a completion, and provide the completion to the application session 308 to present via the client device 304. In some implementations, the application session 308 can iteratively generate completions using the machine learning models 268. For example, the machine learning models 268 can receive a first prompt from the application session 308, determine a first completion based on the first prompt and provide the first completion to the application session 308, receive a second prompt from the application 308, determine a second completion based on the second prompt (which may include at least one of the first prompt or the first completion concatenated to the second prompt), and provide the second completion to the application session 308.

In some implementations, the application session 308 maintains a session state regarding the application session 308. The session state can include one or more prompts received by the application session 308, and can include one or more completions received by the application session 308 from the model system 260. The session state can include one or more items of feedback received regarding the completions, such as feedback indicating accuracy of the completion.

The system 200 can include or be coupled with one or more session inputs 340 or sources thereof. The session inputs 340 can include, for example and without limitation, location-related inputs, such as identifiers of an entity managing an item of equipment or a building or building management system, a jurisdiction (e.g., city, state, country, etc.), a language, or a policy or configuration associated with operation of the item of equipment, building, or building management system. The session inputs 340 can indicate an identifier of the user of the application session 308. The session inputs 340 can include data regarding items of equipment or building management systems, including but not limited to operation data or sensor data. The session inputs 340 can include information from one or more applications, algorithms, simulations, neural networks, machine learning models, or various combinations thereof, such as to provide analyses, predictions, or other information regarding items of equipment. The session inputs 340 can data from or analogous to the data of the data repository 204.

In some implementations, the model system 260 includes at least one sessions database 312. The sessions database 312 can maintain records of application session 308 implemented by client devices 304. For example, the sessions database 312 can include records of prompts provided to the machine learning models 268 and completions generated by the machine learning models 268. As described further with reference to FIG. 4, the system 200 can use the data in the sessions database 312 to fine-tune or otherwise update the machine learning models 268. The sessions database 312 can include one or more session states of the application session 308.

As depicted in FIG. 3, the system 200 can include at least on pre-processor 332. The pre-processor 332 can evaluate the prompt according to one or more criteria and pass the prompt to the model system 260 responsive to the prompt satisfying the one or more criteria, or modify or flag the prompt responsive to the prompt not satisfying the one or more criteria. The pre-processor 332 can compare the prompt with any of various predetermined prompts, thresholds, outputs of algorithms or simulations, or various combinations thereof to evaluate the prompt. The pre-processor 332 can provide the prompt to an expert system (e.g., expert system 700 described with reference to FIG. 7) for evaluation. The pre-processor 332 (and/or post-processor 336 described below) can be made separate from the application session 308 and/or model system 260, which can modularize overall operation of the system 200 to facilitate regression testing or otherwise enable more effective software engineering processes for debugging or otherwise improving operation of the system 200. The pre-processor 332 can evaluate the prompt according to values (e.g., numerical or semantic/text values) or thresholds for values to filter out of domain inputs, such as inputs targeted for jail-breaking the system 200 or components thereof, or filter out values that do not match target semantic concepts for the system 200.

Completion Checking

In some implementations, the system 200 includes an accuracy checker 316. The accuracy checker 316 can include one or more rules, heuristics, logic, policies, algorithms, functions, machine learning models, neural networks, scripts, or various combinations thereof to perform operations including evaluating performance criteria regarding the completions determined by the model system 260. For example, the accuracy checker 316 can include at least one completion listener 320. The completion listener 320 can receive the completions determined by the model system 320 (e.g., responsive to the completions being generated by the machine learning model 268 and/or by retrieving the completions from the sessions database 312).

The accuracy checker 316 can include at least one completion evaluator 324. The completion evaluator 324 can evaluate the completions (e.g., as received or retrieved by the completion listener 320) according to various criteria. In some implementations, the completion evaluator 324 evaluates the completions by comparing the completions with corresponding data from the data repository 204. For example, the completion evaluator 324 can identify data of the data repository 204 having similar text as the prompts and/or completions (e.g., using any of various natural language processing algorithms), and determine whether the data of the completions is within a range of expected data represented by the data of the data repository 204.

In some implementations, the accuracy checker 316 can store an output from evaluating the completion (e.g., an indication of whether the completion satisfies the criteria) in an evaluation database 328. For example, the accuracy checker 316 can assign the output (which may indicate at least one of a binary indication of whether the completion satisfied the criteria or an indication of a portion of the completion that did not satisfy the criteria) to the completion for storage in the evaluation database 328, which can facilitate further training of the machine learning models 268 using the completions and output.

The accuracy checker 316 can include or be coupled with at least one post-processor 336. The post-processor 336 can perform various operations to evaluate, validate, and/or modify the completions generated by the model system 260. In some implementations, the post-processor 336 includes or is coupled with data filters 500, validation system 600, and/or expert system 700 described with reference to FIGS. 5-7. The post-processor 336 can operate with one or more of the accuracy checker 316, external systems 344, operations data 348, and/or role models 360 to query databases, knowledge bases, or run simulations that are granular, reliable, and/or transparent.

Referring further to FIG. 3, the system 200 can include or be coupled with one or more external systems 344. The external systems 344 can include any of various data sources, algorithms, machine learning models, simulations, internet data sources, or various combinations thereof. The external systems 344 can be queried by the system 200 (e.g., by the model system 260) or the pre-processor 332 and/or post-processor 336, such as to identify thresholds or other baseline or predetermined values or semantic data to use for validating inputs to and/or outputs from the model system 260. The external systems 344 can include, for example and without limitation, documentation sources associated with an entity that manages items of equipment.

The system 200 can include or be coupled with operations data 348. The operations data 348 can be part of or analogous to one or more data sources of the data repository 204. The operations data 348 can include, for example and without limitation, data regarding real-world operations of building management systems and/or items of equipment, such as changes in building policies, building states, ticket or repair data, results of servicing or other operations, performance indices, or various combinations thereof. The operations data 348 can be retrieved by the application session 308, such as to condition or modify prompts and/or requests for prompts on operations data 348.

Role-Specific Machine Learning Models

As depicted in FIG. 3, in some implementations, the models 268 can include or otherwise be implemented as one or more role-specific models 360. The models 360 can be configured using training data (and/or have tuned hyperparameters) representative of particular tasks associated with generating accurate completions for the application sessions 308 such as to perform iterative communication of various language model job roles to refine results internally to the model system 260 (e.g., before/after communicating inputs/outputs with the application session 308), such as to validate completions and/or check confidence levels associated with completions. By incorporating distinct models 360 (e.g., portions of neural networks and/or distinct neural networks) configured according to various roles, the models 360 can more effectively generate outputs to satisfy various objectives/key results.

For example, the role-specific models 360 can include one or more of an author model 360, an editor model 360, a validator model 360, or various combinations thereof. The author model 360 can be used to generate an initial or candidate completion, such as to receive the prompt (e.g., via pre-processor 332) and generate the initial completion responsive to the prompt. The editor model 360 and/or validator model 360 can apply any of various criteria, such as accuracy checking criteria, to the initial completion, to validate or modify (e.g., revise) the initial completion. For example, the editor model 360 and/or validator model 360 can be coupled with the external systems 344 to query the external systems 344 using the initial completion (e.g., to detect a difference between the initial completion and one or more expected values or ranges of values for the initial completion), and at least one of output an alert or modify the initial completion (e.g., directly or by identifying at least a portion of the initial completion for the author model 360 to regenerate). In some implementations, at least one of the editor model 360 or the validator model 360 are tuned with different hyperparameters from the author model 360, or can adjust the hyperparameter(s) of the author model 360, such as to facilitate modifying the initial completion using a model having a higher threshold for confidence of outputted results responsive to the at least one of the editor model 360 or the validator model 360 determining that the initial completion does not satisfy one or more criteria. In some implementations, the at least one of the editor model 360 or the validator model 360 is tuned to have a different (e.g., lower) risk threshold than the author model 360, which can allow the author model 360 to generate completions that may fall into a greater domain/range of possible values, while the at least one of the editor model 360 or the validator model 360 can refine the completions (e.g., limit refinement to specific portions that do not meet the thresholds) generated by the author model 360 to fall within appropriate thresholds (e.g., rather than limiting the threshold for the author model 360).

For example, responsive to the validator model 360 determining that the initial completion includes a value (e.g., setpoint to meet a target value of a performance index) that is outside of a range of values validated by a simulation for an item of equipment, the validator model 360 can cause the author model 360 to regenerate at least a portion of the initial completion that includes the value; such regeneration may include increasing a confidence threshold for the author model 360. The validator model 360 can query the author model 360 for a confidence level associated with the initial completion, and cause the author model 360 to regenerate the initial completion and/or generate additional completions responsive to the confidence level not satisfying a threshold. The validator model 360 can query the author model 360 regarding portions (e.g., granular portions) of the initial completion, such as to request the author model 360 to divide the initial completion into portions, and separately evaluate each of the portions. The validator model 360 can convert the initial completion into a vector, and use the vector as a key to perform a vector concept lookup to evaluate the initial completion against one or more results retrieved using the key.

Feedback Training

Figure 4:
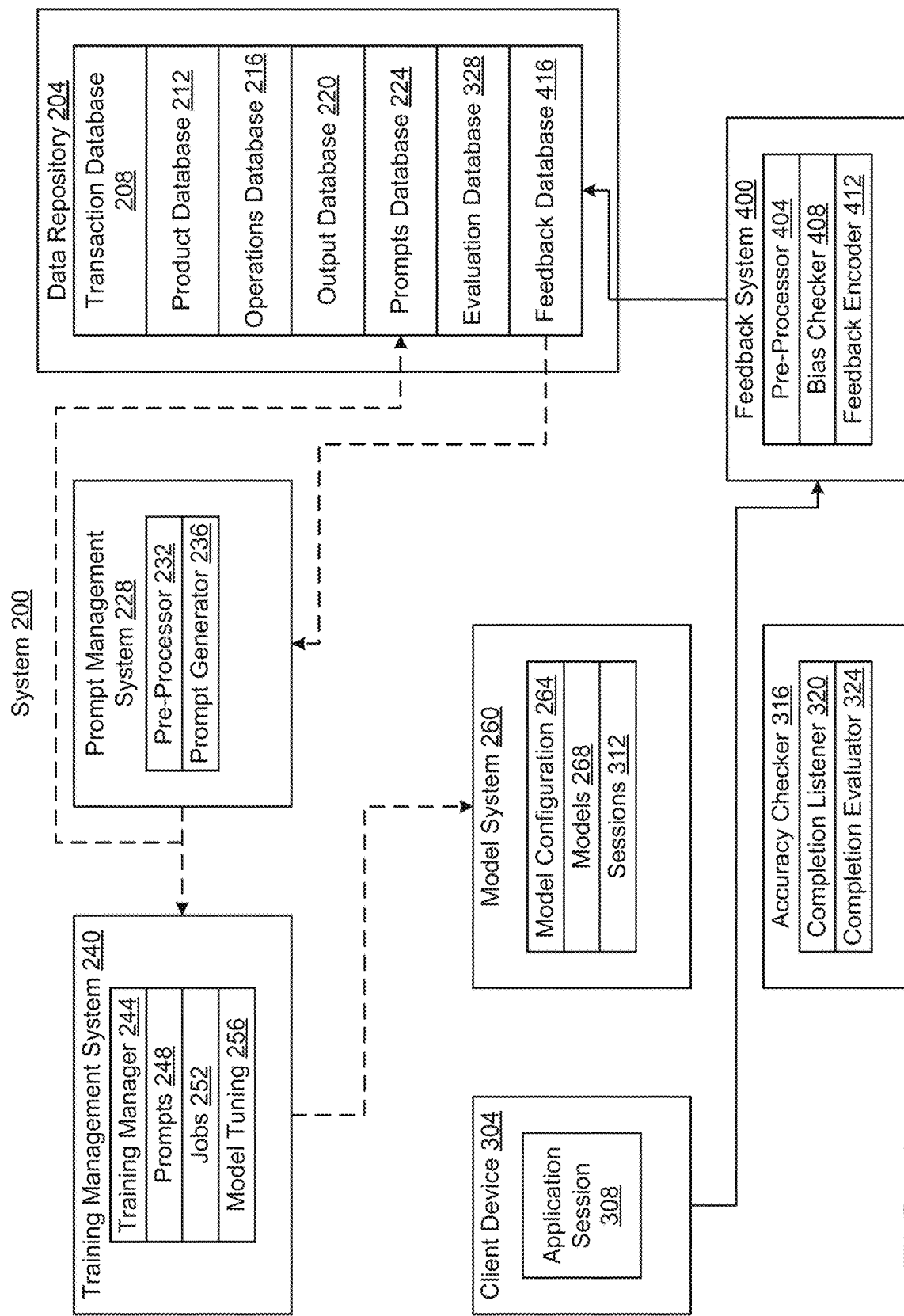
FIG. 4 is a block diagram of an example of the system of FIG. 2 including feedback training components.

FIG. 4 depicts an example of the system 200 that includes a feedback system 400, such as a feedback aggregator. The feedback system 400 can include one or more rules, heuristics, logic, policies, algorithms, functions, machine learning models, neural networks, scripts, or various combinations thereof to perform operations including preparing data for updating and/or updating the machine learning models 268 using feedback corresponding to the application sessions 308, such as feedback received as user input associated with outputs presented by the application sessions 308. The feedback system 400 can incorporate features of the feedback repository 124 and/or feedback trainer 128 described with reference to FIG. 1.

The feedback system 400 can receive feedback (e.g., from the client device 304) in various formats. For example, the feedback can include any of text, speech, audio, image, and/or video data. The feedback can be associated (e.g., in a data structure generated by the application session 308) with the outputs of the machine learning models 268 for which the feedback is provided. The feedback can be received or extracted from various forms of data, including external data sources such as manuals, service reports, or Wikipedia-type documentation.

In some implementations, the feedback system 400 includes a pre-processor 400. The pre-processor 400 can perform any of various operations to modify the feedback for further processing. For example, the pre-processor 400 can incorporate features of, or be implemented by, the pre-processor 232, such as to perform operations including filtering, compression, tokenizing, or translation operations (e.g., translation into a common language of the data of the data repository 204).

The feedback system 400 can include a bias checker 408. The bias checker 408 can evaluate the feedback using various bias criteria, and control inclusion of the feedback in a feedback database 416 (e.g., a feedback database 416 of the data repository 204 as depicted in FIG. 4) according to the evaluation. The bias criteria can include, for example and without limitation, criteria regarding qualitative and/or quantitative differences between a range or statistic measure of the feedback relative to actual, expected, or validated values.

The feedback system 400 can include a feedback encoder 412. The feedback encoder 412 can process the feedback (e.g., responsive to bias checking by the bias checker 408) for inclusion in the feedback database 416. For example, the feedback encoder 412 can encode the feedback as values corresponding to outputs scoring determined by the model system 260 while generating completions (e.g., where the feedback indicates that the completion presented via the application session 308 was acceptable, the feedback encoder 412 can encode the feedback by associating the feedback with the completion and assigning a relatively high score to the completion).

As indicated by the dashed arrows in FIG. 4, the feedback can be used by the prompt management system 228 and training management system 240 to further update one or more machine learning models 268. For example, the prompt management system 228 can retrieve at least one feedback (and corresponding prompt and completion data) from the feedback database 416, and process the at least one feedback to determine a feedback prompt and feedback completion to provide to the training management system 240 (e.g., using pre-processor 232 and/or prompt generator 236, and assigning a score corresponding to the feedback to the feedback completion). The training manager 244 can provide instructions to the model system 260 to update the machine learning models 268 using the feedback prompt and the feedback completion, such as to perform a fine-tuning process using the feedback prompt and the feedback completion. In some implementations, the training management system 240 performs a batch process of feedback-based fine tuning by using the prompt management system 228 to generate a plurality of feedback prompts and a plurality of feedback completion, and providing instructions to the model system 260 to perform the fine-tuning process using the plurality of feedback prompts and the plurality of feedback completions.

Data Filtering and Validation Systems

Figure 5:
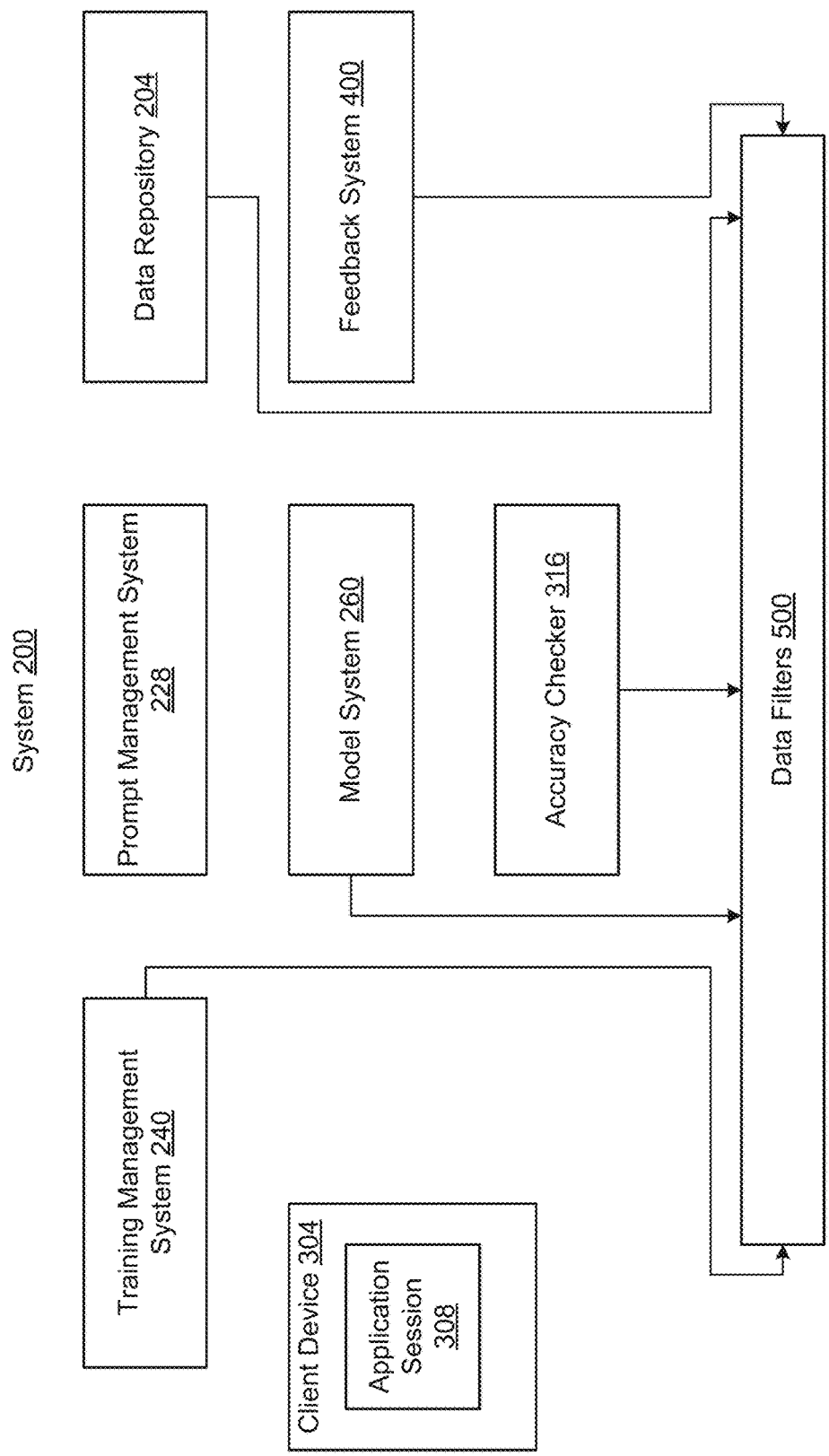
FIG. 5 is a block diagram of an example of the system of FIG. 2 including data filters.

FIG. 5 depicts an example of the system 200, where the system 200 can include one or more data filters 500 (e.g., data validators). The data filters 500 can include any one or more rules, heuristics, logic, policies, algorithms, functions, machine learning models, neural networks, scripts, or various combinations thereof to perform operations including modifying data processed by the system 200 and/or triggering alerts responsive to the data not satisfying corresponding criteria, such as thresholds for values of data. Various data filtering processes described with reference to FIG. 5 (as well as FIGS. 6 and 7) can enable the system 200 to implement timely operations for improving the precision and/or accuracy of completions or other information generated by the system 200 (e.g., including improving the accuracy of feedback data used for fine-tuning the machine learning models 268). The data filters 500 can allow for interactions between various algorithms, models, and computational processes.

For example, the data filters 500 can be used to evaluate data relative to thresholds relating to data including, for example and without limitation, acceptable data ranges, setpoints, temperatures, pressures, flow rates (e.g., mass flow rates), or vibration rates for an item of equipment. The threshold can include any of various thresholds, such as one or more of minimum, maximum, absolute, relative, fixed band, and/or floating band thresholds.

The data filters 500 can enable the system 200 to detect when data, such as prompts, completions, or other inputs and/or outputs of the system 200, collide with thresholds that represent realistic behavior or operation or other limits of items of equipment. For example, the thresholds of the data filters 500 can correspond to values of data that are within feasible or recommended operating ranges. In some implementations, the system 200 determines or receives the thresholds using models or simulations of items of equipment, such as plant or equipment simulators, chiller models, HVAC-R models, refrigeration cycle models, etc. The system 200 can receive the thresholds as user input (e.g., from experts, technicians, or other users). The thresholds of the data filters 500 can be based on information from various data sources. The thresholds can include, for example and without limitation, thresholds based on information such as equipment limitations, safety margins, physics, expert teaching, etc. For example, the data filters 500 can include thresholds determined from various models, functions, or data structures (e.g., tables) representing physical properties and processes, such as physics of psychometrics, thermodynamics, and/or fluid dynamics information.

The system 200 can determine the thresholds using the feedback system 400 and/or the client device 304, such as by providing a request for feedback that includes a request for a corresponding threshold associated with the completion and/or prompt presented by the application session 308. For example, the system 200 can use the feedback to identify realistic thresholds, such as by using feedback regarding data generated by the machine learning models 268 for ranges, setpoints, and/or start-up or operating sequences regarding items of equipment (and which can thus be validated by human experts). In some implementations, the system 200 selectively requests feedback indicative of thresholds based on an identifier of a user of the application session 308, such as to selectively request feedback from users having predetermined levels of expertise and/or assign weights to feedback according to criteria such as levels of expertise.

In some implementations, one or more data filters 500 correspond to a given setup. For example, the setup can represent a configuration of a corresponding item of equipment (e.g., configuration of a chiller, etc.). The data filters 500 can represent various thresholds or conditions with respect to values for the configuration, such as feasible or recommendation operating ranges for the values. In some implementations, one or more data filters 500 correspond to a given situation. For example, the situation can represent at least one of an operating mode or a condition of a corresponding item of equipment.

FIG. 5 depicts some examples of data (e.g., inputs, outputs, and/or data communicated between nodes of machine learning models 268) to which the data filters 500 can be applied to evaluate data processed by the system 200 including various inputs and outputs of the system 200 and components thereof. This can include, for example and without limitation, filtering data such as data communicated between one or more of the data repository 204, prompt management system 228, training management system 240, model system 260, client device 304, accuracy checker 316, and/or feedback system 400. For example, the data filters 500 (as well as validation system 600 described with reference to FIG. 6 and/or expert filter collision system 700 described with reference to FIG. 7) can receive data outputted from a source (e.g., source component) of the system 200 for receipt by a destination (e.g., destination component) of the system 200, and filter, modify, or otherwise process the outputted data prior to the system 200 providing the outputted data to the destination. The sources and destinations can include any of various combinations of components and systems of the system 200.

The system 200 can perform various actions responsive to the processing of data by the data filters 500. In some implementations, the system 200 can pass data to a destination without modifying the data (e.g., retaining a value of the data prior to evaluation by the data filter 500) responsive to the data satisfying the criteria of the respective data filter(s) 500. In some implementations, the system 200 can at least one of (i) modify the data or (ii) output an alert responsive to the data not satisfying the criteria of the respective data filter(s) 500. For example, the system 200 can modify the data by modifying one or more values of the data to be within the criteria of the data filters 500.

In some implementations, the system 200 modifies the data by causing the machine learning models 268 to regenerate the completion corresponding to the data (e.g., for up to a predetermined threshold number of regeneration attempts before triggering the alert). This can enable the data filters 500 and the system 200 selectively trigger alerts responsive to determining that the data (e.g., the collision between the data and the thresholds of the data filters 500) may not be repairable by the machine learning model 268 aspects of the system 200.

The system 200 can output the alert to the client device 304. The system 200 can assign a flag corresponding to the alert to at least one of the prompt (e.g., in prompts database 224) or the completion having the data that triggered the alert.

Figure 6:
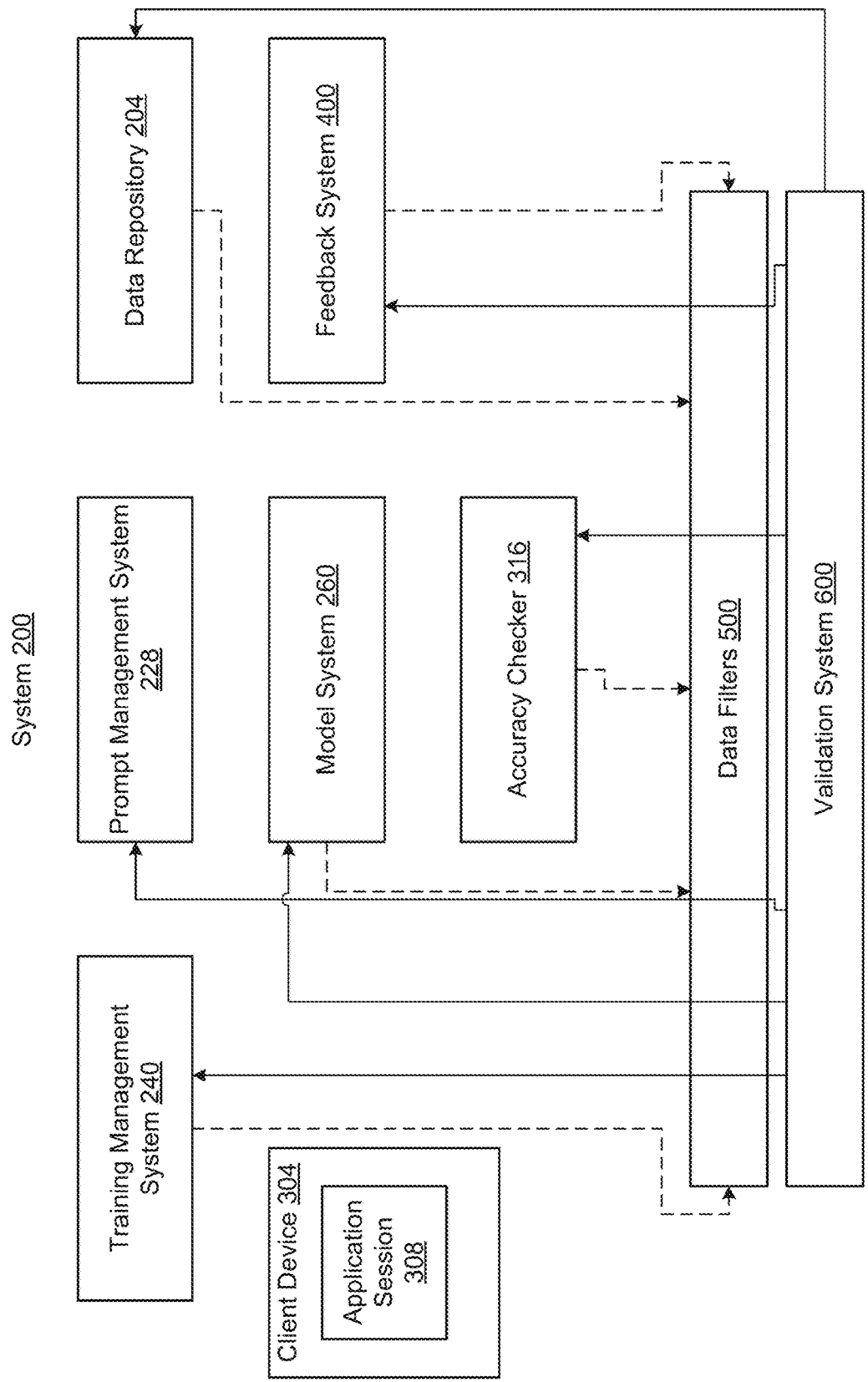
FIG. 6 is a block diagram of an example of the system of FIG. 2 including data validation components.

FIG. 6 depicts an example of the system 200, in which a validation system 600 is coupled with one or more components of the system 200, such as to process and/or modify data communicated between the components of the system 200. For example, the validation system 600 can provide a validation interface for human users (e.g., expert supervisors, checkers) and/or expert systems (e.g., data validation systems that can implement processes analogous to those described with reference to the data filters 500) to receive data of the system 200 and modify, validate, or otherwise process the data. For example, the validation system 600 can provide to human expert supervisors, human checkers, and/or expert systems various data of the system 200, receive responses to the provided data indicating requested modifications to the data or validations of the data, and modify (or validate) the provided data according to the responses.

For example, the validation system 600 can receive data such as data retrieved from the data repository 204, prompts outputted by the prompt management system 228, completions outputted by the model system 260, indications of accuracy outputted by the accuracy checker 316, etc., and provide the received data to at least one of an expert system or a user interface. In some implementations, the validation system 600 receives a given item of data prior to the given item of data being processed by the model system 260, such as to validate inputs to the machine learning models 268 prior to the inputs being processed by the machine learning models 268 to generate outputs, such as completions.

In some implementations, the validation system 600 validates data by at least one of (i) assigning a label (e.g., a flag, etc.) to the data indicating that the data is validated or (ii) passing the data to a destination without modifying the data. For example, responsive to receiving at least one of a user input (e.g., from a human validator/supervisor/expert) that the data is valid or an indication from an expert system that the data is valid, the validation system 600 can assign the label and/or provide the data to the destination.

The validation system 600 can selectively provide data from the system 200 to the validation interface responsive to operation of the data filters 500. This can enable the validation system 600 to trigger validation of the data responsive to collision of the data with the criteria of the data filters 500. For example, responsive to the data filters 500 determining that an item of data does not satisfy a corresponding criteria, the data filters 500 can provide the item of data to the validation system 600. The data filters 500 can assign various labels to the item of data, such as indications of the values of the thresholds that the data filters 500 used to determine that the item of data did not satisfy the thresholds. Responsive to receiving the item of data from the data filters 500, the validation system 600 can provide the item of data to the validation interface (e.g., to a user interface of client device 304 and/or application session 308; for comparison with a model, simulation, algorithm, or other operation of an expert system) for validation. In some implementations, the validation system 600 can receive an indication that the item of data is valid (e.g., even if the item of data did not satisfy the criteria of the data filters 500) and can provide the indication to the data filters 500 to cause the data filters 500 to at least partially modify the respective thresholds according to the indication.

In some implementations, the validation system 600 selectively retrieves data for validation where (i) the data is determined or outputted prior to use by the machine learning models 268, such as data from the data repository 204 or the prompt management system 228, or (ii) the data does not satisfy a respective data filter 500 that processes the data. This can enable the system 200, the data filters 500, and the validation system 600 to update the machine learning models 268 and other machine learning aspects (e.g., generative AI aspects) of the system 200 to more accurately generate data and completions (e.g., enabling the data filters 500 to generate alerts that are received by the human experts/expert systems that may be repairable by adjustments to one or more components of the system 200).

Figure 7:
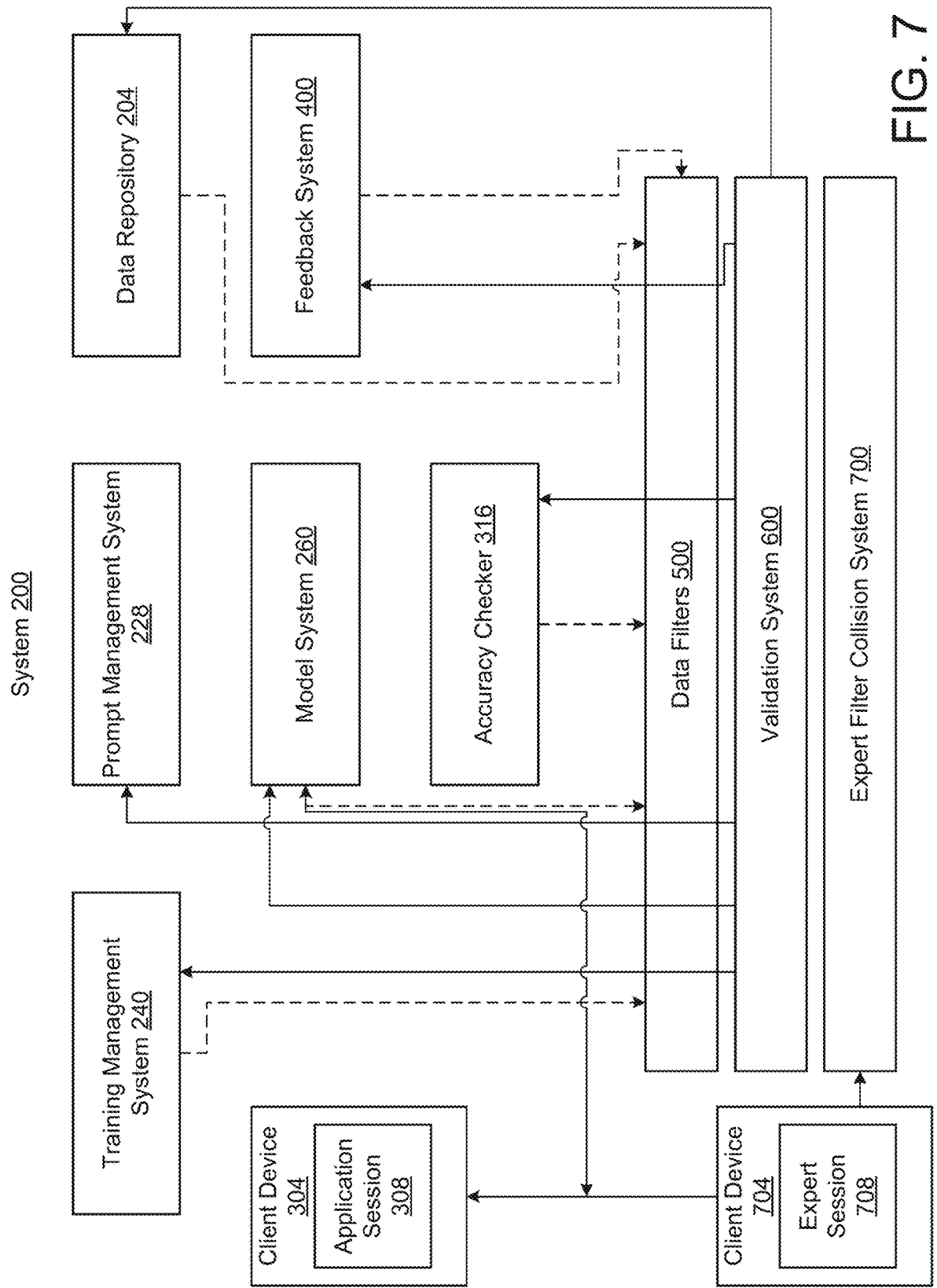
FIG. 7 is a block diagram of an example of the system of FIG. 2 including expert review and intervention components.

FIG. 7 depicts an example of the system 200, in which an expert filter collision system 700 ("expert system" 700) can facilitate providing feedback and providing more accurate and/or precise data and completions to a user via the application session 308. For example, the expert system 700 can interface with various points and/or data flows of the system 200, as depicted in FIG. 7, where the system 200 can provide data to the expert filter collision system 700, such as to transmit the data to a user interface and/or present the data via a user interface of the expert filter collision system 700 that can be accessed via an expert session 708 of a client device 704. For example, via the expert session 708, the expert session 700 can enable functions such as receiving inputs for a human expert to provide feedback to a user of the client device 304; a human expert to guide the user through the data (e.g., completions) provided to the client device 304, such as reports, insights, and action items; a human expert to review and/or provide feedback for revising insights, guidance, and recommendations before being presented by the application session 308; a human expert to adjust and/or validate insights or recommendations before they are viewed or used for actions by the user; or various combinations thereof. In some implementations, the expert system 700 can use feedback received via the expert session as inputs to update the machine learning models 268 (e.g., to perform fine-tuning).

In some implementations, the expert system 700 retrieves data to be provided to the application session 308, such as completions generated by the machine learning models 268. The expert system 700 can present the data via the expert session 708, such as to request feedback regarding the data from the client device 704. For example, the expert system 700 can receive feedback regarding the data for modifying or validating the data (e.g., editing or validating completions). In some implementations, the expert system 700 requests at least one of an identifier or a credential of a user of the client device 704 prior to providing the data to the client device 704 and/or requesting feedback regarding the data from the expert session 708. For example, the expert system 700 can request the feedback responsive to determining that the at least one of the identifier or the credential satisfies a target value for the data. This can allow the expert system 708 to selectively identify experts to use for monitoring and validating the data.

In some implementations, the expert system 700 facilitates a communication session regarding the data, between the application session 308 and the expert session 708. For example, the expert session 700, responsive to detecting presentation of the data via the application session 308, can request feedback regarding the data (e.g., user input via the application session 308 for feedback regarding the data), and provide the feedback to the client device 704 to present via the expert session 708. The expert session 708 can receive expert feedback regarding at least one of the data or the feedback from the user to provide to the application session 308. In some implementations, the expert system 700 can facilitate any of various real-time or asynchronous messaging protocols between the application session 308 and expert session 708 regarding the data, such as any of text, speech, audio, image, and/or video communications or combinations thereof. This can allow the expert system 700 to provide a platform for a user receiving the data (e.g., customer or field technician) to receive expert feedback from a user of the client device 704 (e.g., expert technician). In some implementations, the expert system 700 stores a record of one or more messages or other communications between the sessions 308, 708 in the data repository 204 to facilitate further configuration of the machine learning models 268 based on the interactions between the users of the sessions 308, 708.

Building Data Platforms and Digital Twin Architectures

Referring further to FIGS. 1-7, various systems and methods described herein can be executed by and/or communicate with building data platforms, including data platforms of building management systems. For example, the data repository 204 can include or be coupled with one or more building data platforms, such as to ingest data from building data platforms and/or digital twins. The client device 304 can communicate with the system 200 via the building data platform, and can feedback, reports, and other data to the building data platform. In some implementations, the data repository 204 maintains building data platform-specific databases, such as to enable the system 200 to configure the machine learning models 268 on a building data platform-specific basis (or on an entity-specific basis using data from one or more building data platforms maintained by the entity).

For example, in some implementations, various data discussed herein may be stored in, retrieved from, or processed in the context of building data platforms and/or digital twins; processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises; and/or implemented using one or more gateways for communication and data management amongst various such systems/devices. In some such implementations, the building data platforms and/or digital twins may be provided within an infrastructure such as those described in U.S. patent application Ser. No. 17/134,661 filed Dec. 28, 2020, Ser. No. 18/080,360, filed Dec. 13, 2022, Ser. No. 17/537,046 filed Nov. 29, 2021, and Ser. No. 18/096,965, filed Jan. 13, 2023, and Indian Patent Application No. 202341008712, filed Feb. 10, 2023, the disclosures of which are incorporated herein by reference in their entireties.

III. Knowledge-Graph-Based Generative Artificial Intelligence

As described above, systems and methods in accordance with the present disclosure can use machine learning models, including LLMs and other generative AI models, to ingest data regarding building management systems and equipment in various unstructured and structured formats, and generate completions and other outputs targeted to provide useful information to users. Various systems and methods described herein can use machine learning models to support applications for presenting data with high accuracy and relevance. In some implementations, systems and methods described herein can process unstructured data into a knowledge graph and/or receive data in a knowledge graph structure (e.g., a graph data structure in which data elements are assigned associations (e.g., links) identifying one or more other data elements that may have hierarchical relationships with the data elements, such as to be higher or lower in a hierarchy and/or to be members of groups, where various such relationships can be indicative of positional, structural, and or functional relationships between the items of equipment that are represented by the data elements. The machine learning models can generate more accurate outputs using the ingestion of the knowledge graph data structures, which can reduce computational processing demands (e.g., processor usage; API calls) by enabling the machine learning models to more rapidly generate outputs that are consistent with the information sought to be represented by the outputs (e.g., by reducing a number of iterations of prompt/completion sequences as each given iteration is more accurate).

Knowledge-Graph-Based GAI Architectures for Building Management Systems

Figure 8:
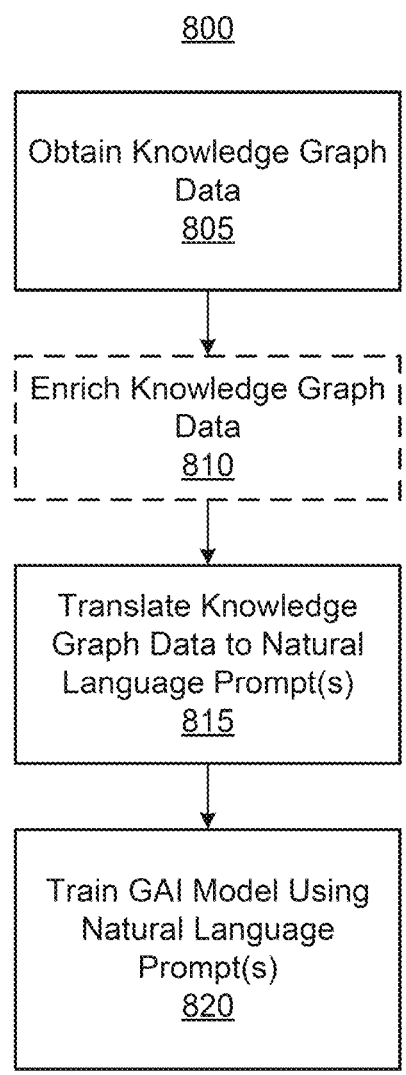
FIG. 8 is a flow diagram of an example method of implementing a knowledge-graph-based training process for machine learning algorithms for building management systems.

FIG. 8 depicts an example of a method 800. The method 800 can be performed using various devices and systems described herein, including but not limited to the systems 100, 200 or one or more components thereof. Various aspects of the method 800 can be implemented using one or more devices or systems that are communicatively coupled with one another, including in client-server, cloud-based, or other networked architectures. As described with respect to various aspects of the system 200 (e.g., with reference to FIGS. 3-7), the method 800 can implement operations to facilitate more accurate, precise, and/or timely determination of completions to prompts from users regarding a variety of assets or entities associated with a building.

At 805, building knowledge graph data is obtained. The building knowledge graph can describe at least a portion of or an entire site with multiple buildings, a single building, and/or a sub-area within a building (e.g., a floor of a building). The building knowledge graph can be obtained from a building knowledge graph database (e.g., a data source 112) of a BMS (e.g., the system 100). In some instances, an entire building knowledge graph may be obtained at one time. In other instances, a subset of nodes and/or edges of a building knowledge graph can be obtained selectively in response to and based on a received user prompt, as will be described below. The building knowledge graph can include a graph data structure that includes data elements (e.g., nodes) representative of structures of buildings and/or of items of equipment, such as data elements that indicate features of items of equipment such as locations (e.g., in a building), functions, structures, or make or model information, including relational information amongst the items of equipment and/or between the items of equipment and the building. For example, the knowledge graph can include nodes arranged to indicate one or more first items of equipment in a first portion of a building and to indicate one or more second items of equipment in a second portion of a building, as well as connections (e.g., electronic, electrical, fluid, communicative, etc.) amongst respective first and/or second items of equipment as appropriate.

At 810, the building knowledge graph data can be enriched. The building knowledge graph data can be enriched using various information pertaining to nodes and/or edges of the building knowledge graph pulled from a variety of internal or external databases, knowledge bases, or other information sources (e.g., data sources 112). In some instances, the information can be pulled from a digital twin and/or other building data platform. The information can include additional contextual, spatial, alarm-related, causal, or other types of information not included within the building knowledge graph but otherwise pertinent to one or more of the nodes and/or edges of the building knowledge graph (e.g., pertinent to entities and/or relationships between entities within the building or site). The pulled information can be used to enrich or otherwise provide additional context pertaining to the nodes and/or edges of the building knowledge graph for use in training the GAI model, as will be discussed below. In some implementations, the building knowledge graph node and/or edge enrichment process may be similar to any of the enrichment processes described in U.S. patent application Ser. No. 17/134,659 filed Dec. 28, 2020, Ser. No. 17/134,691 filed Dec. 28, 2020, Ser. No. 17/853,352 filed Jun. 29, 2022, and International Patent Application No. PCT/US2022/034101 filed Jun. 17, 2022, the disclosures of which are incorporated herein by reference in their entireties.

At 815, the building knowledge graph data is translated to natural language prompts. For example, the building knowledge graph data is obtained in a raw format, which can be represented using a BRICK or any other suitable ontology-based metadata schema. In some implementations, the building knowledge graph data includes a plurality of graph nodes and edges that can be split out into individual nodes and edges or into logical or hierarchical groups of nodes or edges for translation. In some instances, the nodes and edges in the building knowledge graph can be sorted into a hierarchy of building-related assets from a top or broadest level down to a bottom or most detailed level. As an example, a top or broadest level can be an entire building or site entity. The next level can be spatial entities within the building or site entity (e.g., a particular floor, room, or zone within the building or site entity). The next level can be specific equipment and/or asset entities within the various spatial entities (e.g., a particular HVAC system entity, a thermostat entity). The bottom or most detailed level can be various point entities within the various equipment and/or asset entities (e.g., a subcomponent entity within a larger device entity). In other implementations, other types of logical or hierarchical groupings can be utilized.

Each entity within the building knowledge graph can be translated from its raw format to one or more natural language prompts based on the structure of its associated nodes and/or edges. For example, in some implementations, a given entity within a building knowledge graph can have a first node or edge specifying the entity and its type and one or more second nodes or edges specifying the entity and its properties and/or relationships to other entities within the building. Accordingly, the building knowledge graph can be queried (e.g., using SPARQL) for each entity to obtain the entity's type and its various properties and relationships to other entities within the building.

As an example, if a given entity within the building knowledge graph has a first node or edge that reads "b:V1 rdf:type brick:VAV" in its raw format and a second node or edge that reads "b:V1 brick:hasPoint b:ZNT1" in its raw format, a natural language prompt or sentence can be generated for the entity (e.g., V1) that pulls the entity type from the first node or edge (e.g., VAV) and pulls a relationship with another entity from the second node or edge (e.g., V1 has a point ZNT1) to form a natural language sentence in the form of "V1 is a VAV and has a point ZNT1."

In some instances, nodes or edges can include various graph-related extras (e.g., URLs), which can be removed when the nodes or edges are translated into the natural language prompts or sentences. In some instances, an entity's type, property, or relationship within a node or edge can be formatted specifically for BRICK or another ontology schema, which can be changed into a corresponding natural language phrase. For example, "Zone_Temperature_Sensor" from a BRICK schema can be translated to "zone temperature sensor" and "X isPointOf Y" can be translated to "X is a point of Y." Similarly, "Y hasPoint X" can be inversely translated to "X is a point of Y."

In some implementations, the type, properties, and relationships associated with an entity can be combined into a single natural language prompt (e.g., a description in the form of a long sentence) describing the entity, its type, its relationships, and its various properties. If a single entity is related to a plurality of other entities in a similar way, the natural language sentence or paragraph generated can combine or otherwise simplify the relationships. For example, instead of repeating "X is a point of Y and X is a point of Z," the generated sentence or paragraph can include "X is a point of Y and Z." In some implementations, the generated natural language description can further ensure proper casing (e.g., representing the data from the knowledge graph with accurate uppercase and/or lowercase features) such that, for example, "X rdf:type brick:VAV" becomes "X is a VAV," but "X rdf:type Temperature_Sensor" becomes "X is a temperature sensor."

In some implementations, the nodes or edges in their raw format can be translated into the natural language prompts for the various entities manually by a user via a user interface, using a translation application or program specifically configured to translate a given ontology schema into natural language prompts, and/or using one or more artificial intelligence models (e.g., one or more of the artificial intelligence models described herein). For example, one or more contextual rules for translating the raw format nodes and edges into natural language prompts can be provided as inputs to train one or more artificial intelligence models to allow for the artificial intelligence models to be used to autonomously translate raw format (e.g., BRICK or other ontology schema) nodes and edges into natural language prompts, as discussed above. Accordingly, in some instances, the entire building knowledge graph may be translated into natural language text using one or more of the machine learning models described herein.

At 820, the machine learning model is trained or otherwise fine-tuned using the natural language prompts. In some implementations, the natural language prompts for an entire building knowledge graph can be provided as training inputs to the machine learning model. In some other instances, a subset of nodes and/or edges selectively chosen based on a received user prompt can be provided as training inputs. For example, in some instances, the machine learning model can be trained in real-time or near real-time in response to a user prompt, as will be described below.

In some implementations, prior to training the machine learning model, the natural language prompts can be converted into vectors to be indexed and stored within a vector storage and similarity search database. For example, in some instances, the natural language text may be provided to an embedding model to convert the natural language text into indexable vectors that can be easily utilized by the machine learning models described herein. The embedding model can receive the natural language prompts (and/or one or more tokens thereof as generated by a tokenizer, such as a byte pair encoding tokenizer, etc.), and apply the natural language prompts as input to the embedding model to cause the embedding model to generate respective vectors representing the natural language prompts in an n-dimensional space. The embedding model can include any of various functions, algorithms, rules, and/or machine learning models configured to generate vectors representative of text or semantic data, including but not limited to models such as CNNs, word2vec, or BERT.

Figure 9:
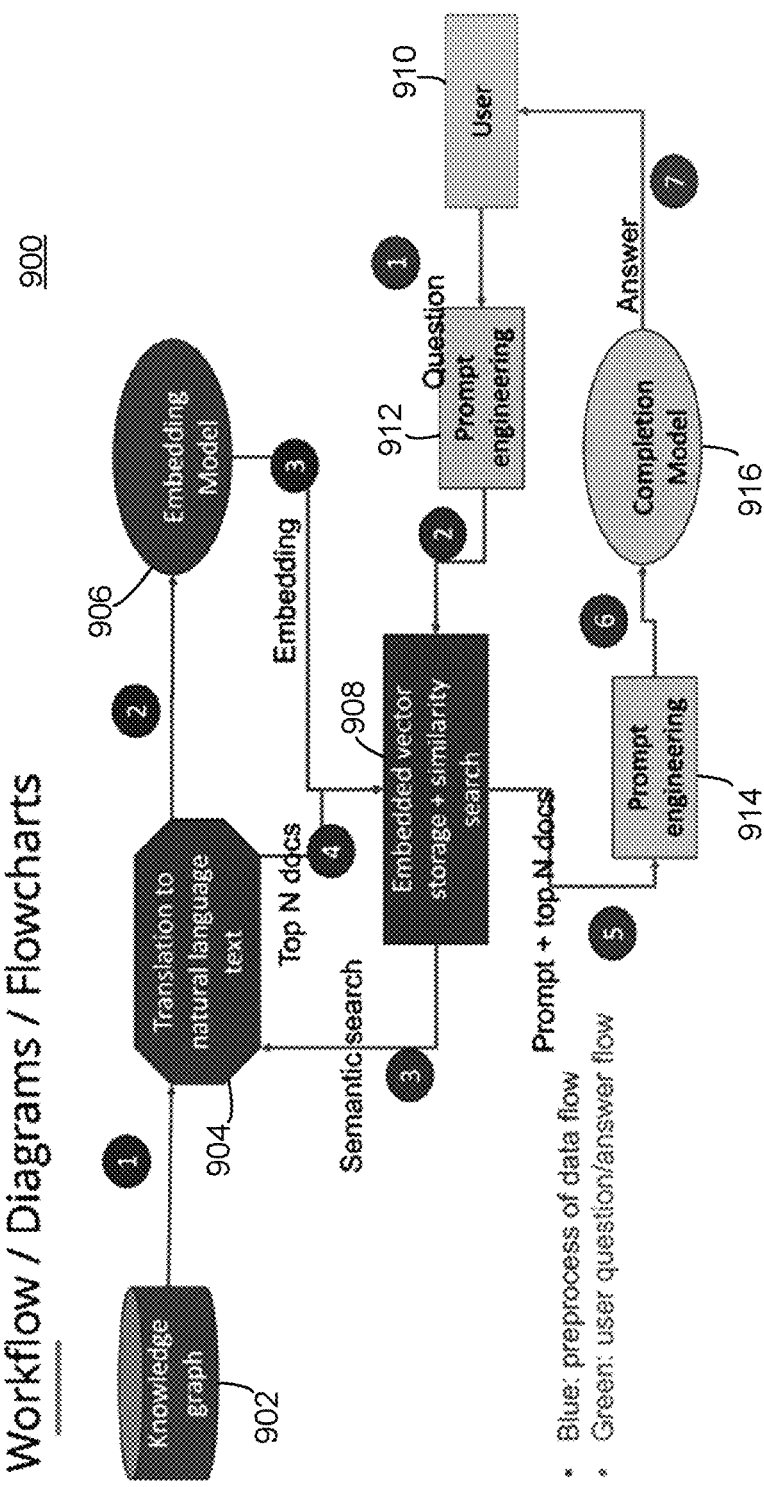
FIG. 9 is a workflow diagram of an example combined knowledge-graph-based training and completion generation process for machine learning algorithms for building management systems.
Figure 10:
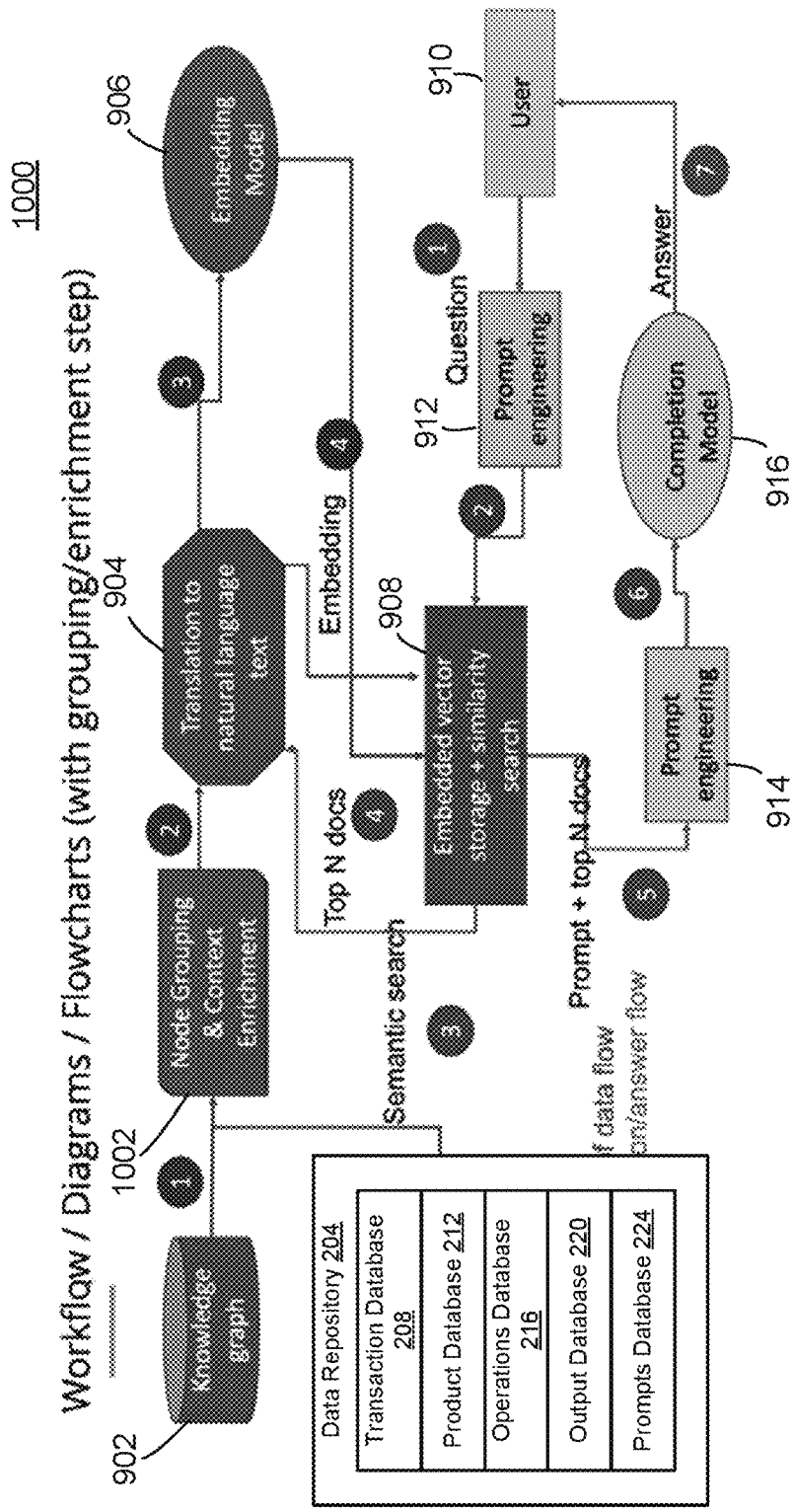
FIG. 10 is a workflow diagram of an example combined knowledge-graph-based training and completion generation process for machine learning algorithms for building management systems.
Figure 11:
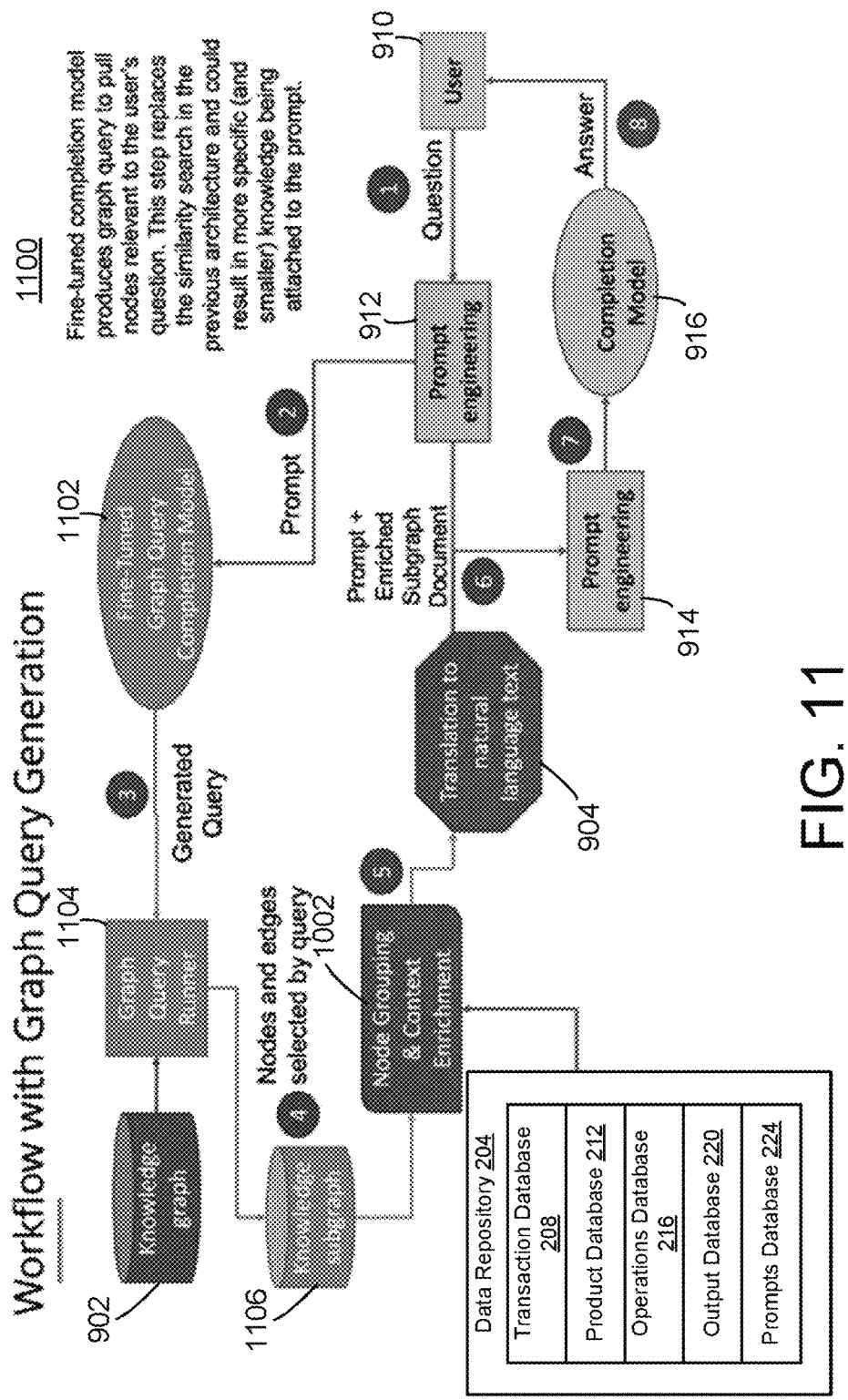
FIG. 11 is a workflow diagram of an example combined knowledge-graph-based training and completion generation process for machine learning algorithms for building management systems.

FIGS. 9-11 depict various examples of workflows that can utilize the knowledge-graph-based training method discussed above, with respect to FIG. 8. It will be appreciated that these workflows are provided as examples and are not meant to be limiting. For example, in some implementations, additional elements or steps may be included, various elements or steps may be omitted, and/or the elements or steps may be provided in a different order or arrangement, and all such modifications fall within the scope of the present disclosure.

FIG. 9 depicts an example workflow 900 for a system (e.g., any of the systems described herein) including a training process (i.e., steps 902-908) for a machine learning model similar to the method discussed above, with respect to FIG. 8, and a related user prompt completion generation process (i.e., steps 910, 912, 908, 914, and 916). As illustrated, the training process includes retrieving building knowledge graph data from a knowledge graph, at step 902, and translating the building knowledge graph data to natural language text prompts, at step 904. The natural language text prompts can then be applied to an embedding machine learning model, at step 906, to be indexed and stored within a vector storage and similarity search database, at step 908.

With the knowledge graph nodes and edges translated into natural text prompts and converted into corresponding vectors stored within the embedded vector storage and similarity search database, the system can then perform the user prompt completion generation process to generate one or more user prompt completions. For example, a user can provide a prompt to the system, at step 910. As an example, the prompt can be a request or query for a variety of different information pertaining to one or more assets within a building associated with the system. The prompt can be received by the system via a user interface implemented by an application session of a client device. The prompt can be received in any of various data formats, such as text, audio, speech, image, and/or video formats. In some implementations, the application session provides a conversational interface or chatbot for receiving the prompt and can present queries via the application to request information for the prompt.

The system can then apply prompt engineering to the user's prompt, at step 912. The prompt engineering can include adding context or clarifications to the user's prompt in preparation for applying the prompt to the embedded vector storage and similarity search database, at step 908. In some instances, the prompt engineering can further include converting or parsing the user prompt into one or more vectors or tokens, in accordance with the methods described herein, in preparation for applying the prompt to the embedded vector storage and similarity search database, at step 908.

The prompt-engineered user prompt (e.g., the vectors or tokens representing the nodes and/or edges and the added context and/or clarifications) can then be applied to the similarity search database, at step 908, to identify the top related information from the stored embedded vectors related to the user's request or query. The system can then again apply prompt engineering, at step 914, to add the identified top related information to the user prompt and apply the prompt-engineered user prompt to a completion machine learning model configured to provide a completion to the user, at step 916.

In some implementations, the completion is presented via the application session. For example, the completion can be presented as any of text, speech, audio, image, and/or video data to represent the completion, such as to provide an answer to a request for information pertaining to various entities within the building. The completion can be presented via iterative generation of completions responsive to iterative receipt of prompts. The completion can be presented with a user input element indicative of a request for feedback regarding the completion, such as to enable the prompt and completion to be used for updating the machine learning models.

FIG. 10 depicts another example workflow 1000. The workflow 1000 is substantially similar to the workflow 900. Accordingly, workflow 1000 includes the same steps 902-916 as workflow 900, which can be performed as discussed above, with respect to FIG. 9. However, the workflow 1000 includes a modified training process that additionally includes pulling enrichment data from one or more enrichment data sources (e.g., data repository 204) and performing node grouping and context enrichment, at step 1002. This node enrichment process can be performed substantially similar to the process discussed above, with regard to step 810 of the method 800 shown in FIG. 8. In some implementations, graph nodes can be grouped and enriched together based on a particular entity type, property, or various entity relationships. In some implementations, each graph node can be enriched on an individual basis.

By enriching the various graph nodes, additional context about each node is provided within the natural language prompts that are ultimately generated for each graph node. Accordingly, using the natural language prompts including the additional context about each graph node (and thus each corresponding entity within the building) to train or fine-tune the machine learning model allows for the machine learning model to provide more relevant information within completions provided to users in response to user prompts.

FIG. 11 depicts another example workflow 1100. The workflow 1100 includes a variety of similar steps as those discussed above, with respect to workflow 900 and workflow 1000, which can be performed as discussed above, with respect to FIGS. 9 and 10. However, workflow 1100 replaces the ahead-of-time knowledge graph node splitting and similarity search discussed above, with respect to FIGS. 9 and 10, with a just-in-time graph querying approach.

For example, after performing prompt engineering on the user's prompt, at step 912, instead of applying the prompt-engineered user prompt to a similarity search database, the prompt-engineered user prompt can be applied to a fine-tuned graph query completion model, at step 1102. The fine-tuned graph query completion model can produce a graph query (e.g., a SPARQL query) configured to pull nodes and/or edges from a knowledge graph that are relevant to the user prompt (e.g., relevant to a question indicated within the user prompt). Once the graph query has been generated, the graph query can be applied to a graph query runner, at step 1104, to pull the relevant nodes and/or edges from the knowledge graph obtained at step 902 to generate a relevant knowledge subgraph, at step 1106.

As an illustrative example, a user prompt can include a question asking "room 123 is too hot, what could potentially be the problem?" In this example, the query completion model can then produce a graph query to produce all nodes in a subgraph of nodes servicing "room 123" to be utilized for generating a completion in response to the user prompt. It will be appreciated that a variety of other information within the user prompt can be utilized to generate an appropriate graph query configured to pull a relevant subset of nodes and/or edges from the building knowledge graph.

Once the knowledge subgraph has been generated, the nodes and edges within the knowledge subgraph can be grouped and enriched, at step 1002, and translated into natural text prompts, at step 904, as discussed above, with respect to FIGS. 9 and 10. However, in the workflow 1100, the natural text prompts generated based on the relevant knowledge subgraph can be used in place of identifying the top related information from the stored embedded vectors within a similarity search database. Accordingly, the system can apply similar prompt engineering to add the natural language text prompts generated based on the relevant knowledge subgraph to the user prompt, at step 914, and apply the prompt-engineered user prompt to the completion machine learning model to provide the completion to the user, at step 916.

By pulling only relevant nodes and/or edges, the fine-tuned graph query completion model allows for the just-in-time graph querying approach shown in FIG. 11 to attach a more specific and smaller set of knowledge to the user prompt before applying the user prompt to the completion model, at step 916. Thus, the workflow 1100 allows for the system to provide accurate responses to user prompts based on relevant nodes and/or edges and associated enrichment data, while requiring less overall data processing and analysis compared to the full ahead-of-time training process discussed above, with respect to FIGS. 9 and 10, thereby reducing computational burden placed on the system, as well as system power consumption and time-to-compute durations.

The knowledge-graph-based training methods and process described herein allow for accurate completions to be generated for a variety of user prompts relating to various assets or entities associated with a building management system. In some implementations, using machine learning models trained with the knowledge-graph-based training methods described above, the system can generate completions related to what and/or how many components are within a given space (e.g., a floor) of a building, details about specific components or equipment within the building (e.g., details about a specific HVAC component), providing directions from one location within a building to another location within a building (e.g., explaining how to get from one room to another room or how to get to a given device within the building), and explaining and/or providing key details pertaining to a building (e.g., explanations and/or descriptions of spaces within the building and/or equipment within the building). It will be appreciated that these completions are provided as examples and are in no way meant to be limiting. In some implementations, the systems described herein can generate a variety of additional types of completion information in response to various user prompts using machine learning models trained in accordance with the methods described herein, each of which fall within the scope of the present disclosure.

Additionally, in some implementations, the machine learning model(s) used to generate the completions described herein can be updated according to at least one of the prompt, the completion, or feedback received from the user. For example, a training data element for updating the model can include the prompt, the completion, and the feedback, such as to represent whether a completion appropriately satisfied a user's request for information. The machine learning models can be updated according to indications of accuracy determined by operations of the system such as accuracy checking, or responsive to evaluation of completions by experts (e.g., responsive to selective presentation and/or batch presentation of prompts and completions to experts). Similarly, if a building knowledge graph or building knowledge database change occurs (e.g., indicating a redesign, equipment removal, operational changes), the system can automatically retrain the machine learning model(s) based on the new building knowledge graph and/or new enrichment information associated with the change.

Further, in some implementations, the machine learning model(s) used to generate the completions can determine that a completion confidence score for the completion to the prompt is less than a threshold. The threshold can be a percentage-based threshold or any other suitable threshold. Upon determining that the completion confidence score for a given user prompt is less than the threshold, the machine learning model(s) can generate one or more requests for additional information which can then be presented to the user (e.g., via a display or an audio output device). Accordingly, the user can provide the additional information to the system, and the additional information can be used to update the machine learning model(s) to improve accuracy of the machine learning model completions.

As an example, if a user asks a broad question about a class of elements generally (e.g., "what components are in one HVAC zone?"), the system may provide a completion providing a general answer (e.g., including a number of rooms generally found within a given type of zone). However, the system can determine that the completion confidence score for the completion to the prompt is below the threshold (e.g., the question is too broad for the system to be confident that the completion is useful). In this example, the system may ask a follow-up question asking for a specific component the user is interested in getting information about (e.g., "Do you have specific HVAC zone in mind? If so, I can look up additional details.").

In some implementations, the system can apply context knowledge from the user prompt to the machine learning model(s) used to generate the completions to update the machine learning model(s). As an example, if a user asks how to get from room 1229 to room 3114 within a building, the knowledge graph (and thus the completion model) may not include any information on building room layouts. Accordingly, without additional context, the completion model may not be able to provide the user with instructions for getting from room 1229 to room 3114. However, if the user provides the additional context within the user prompt that "the first digit within each room number corresponds to a floor level of the room," the system can update the completion using this additional knowledge. Accordingly, with this additional context, the completion model may be able to provide instructions to guide the user from room 1229 to room 3114 (e.g., "Find the nearest elevator or staircase and go up to the third floor. Once on the third floor, navigate to room 3114"). It will be appreciated that, in some instances, contextual information received within a user prompt may be universally applicable information. Accordingly, in these instances, the machine learning model(s) may be updated to apply the contextual information to other applicable nodes and/or edges in response to future user prompts.

IV. Language Model-Based Data Structure Generation

Building management systems can provide various data retrieval, processing, and analytics services based on data generated by sensors and other components or items of equipment included in or coupled with the building management systems. However, it can be challenging to precisely retrieve data relevant to a target query in order to process the relevant data (e.g., while avoiding retrieval of data not relevant to the target query). Some building management systems or entities associated with building management systems can provide data catalogs that indicate information such as lineage or provenance of data from data sources, as well as information regarding the data available in data sources. However, catalogs (whether manually or automatically generated) can be difficult to scale or otherwise update in response to changes in the data sources available, such as changes in the items of equipment connected with the building management system. In addition, it can be difficult to correctly validate the quality and/or accuracy of how the catalog represents information regarding building data sources.

Systems and methods in accordance with the present disclosure can generate outputs regarding queries for data retrieval with greater accuracy, precision, and/or fidelity with respect to the queries. For example, a machine learning model, such as an LLM (for example and without limitation, a neural network model that includes one or more transformers, encoders, and/or decoders) can be fine-tuned or otherwise configured using training data specifically structured in a manner to take advantage of the ability of the machine learning model to accurately relate semantic or natural language representations included in the query to characteristics of the data sources that the machine learning model is configured to retrieve data from. This can allow for a system that can provide data as a service (DaaS) functionality on top of disparate data sources from building management systems and components (e.g., from items of equipment, sensors evaluating items of equipment, controllers, communication systems, etc.).

For example, the machine learning model can relate similar and/or identical data from data sources that structure the data in non-identical manners (e.g., different data definitions, orders of arrangement, hierarchies, etc.) in order to fuse or otherwise integrate the data for retrieval responsive to queries. As such, the machine learning model can operate as a metadata ingestor that can detect commonality by creating and storing relationships between various datasets and the characteristics within. This can include, for example, providing hidden relationships between data at various levels (e.g., bottom to top levels) of data structures, such as to use the language processing capabilities of the machine learning model to relate data elements at different levels based on the language used as the data definitions (e.g., where the structure, such as hierarchical structures, between the data elements would otherwise obscure the relations if parsed using other techniques).

Systems and methods in accordance with the present disclosure can enable a data manager, such as a data/metadata/context abstraction and/or management layer, to control the data to be applied to the machine learning model to fine tune or otherwise configure the machine learning model. This can allow for the quality of and timing of application of data to the machine learning model to be controlled, facilitating more effective training of the machine learning model. For example, this can facilitate adapting the machine learning model as the data available scales or otherwise changes. In addition, this can allow the system to operate as an automated data processing pipeline to retrieve, transform, and deliver the data, including metadata, to the machine learning model. The data manager can provide abstraction (e.g., relating disparate data at a conceptual or semantic level) for historic and incremental ingestion and/or application to the machine learning model.

In some implementations, the machine learning model is coupled with a user interface to receive queries (e.g., input prompt queries), provide outputs (e.g., output prompts to the queries), and also receive feedback regarding the outputs to update the outputs based on the feedback. For example, the machine learning model can include or be coupled with a conversational interface, such as a chatbot or other conversational AI, to allow for a natural language interface for a user (e.g., even if the user is not familiar with the specific data structuring, metadata, or definitions for the data that the user is requesting via the query). The system can control data access for data used by the machine learning model according to various data access policies.

For example, systems and methods in accordance with the present disclosure can expose a language model-based conversational interface to allow for a user (e.g., data analyst) to provide a query for requests including but not limited to data availability with respect to a whole building or subsystems, data relating to outcomes or other semantic categories such as sustainability, comfort, or operations, or data relating to evaluations to be performed using the data. The system can allow for prompts to be entered in plain, natural language, such as to request samples of datasets as well as to perform exploratory data analysis.

Figure 12:
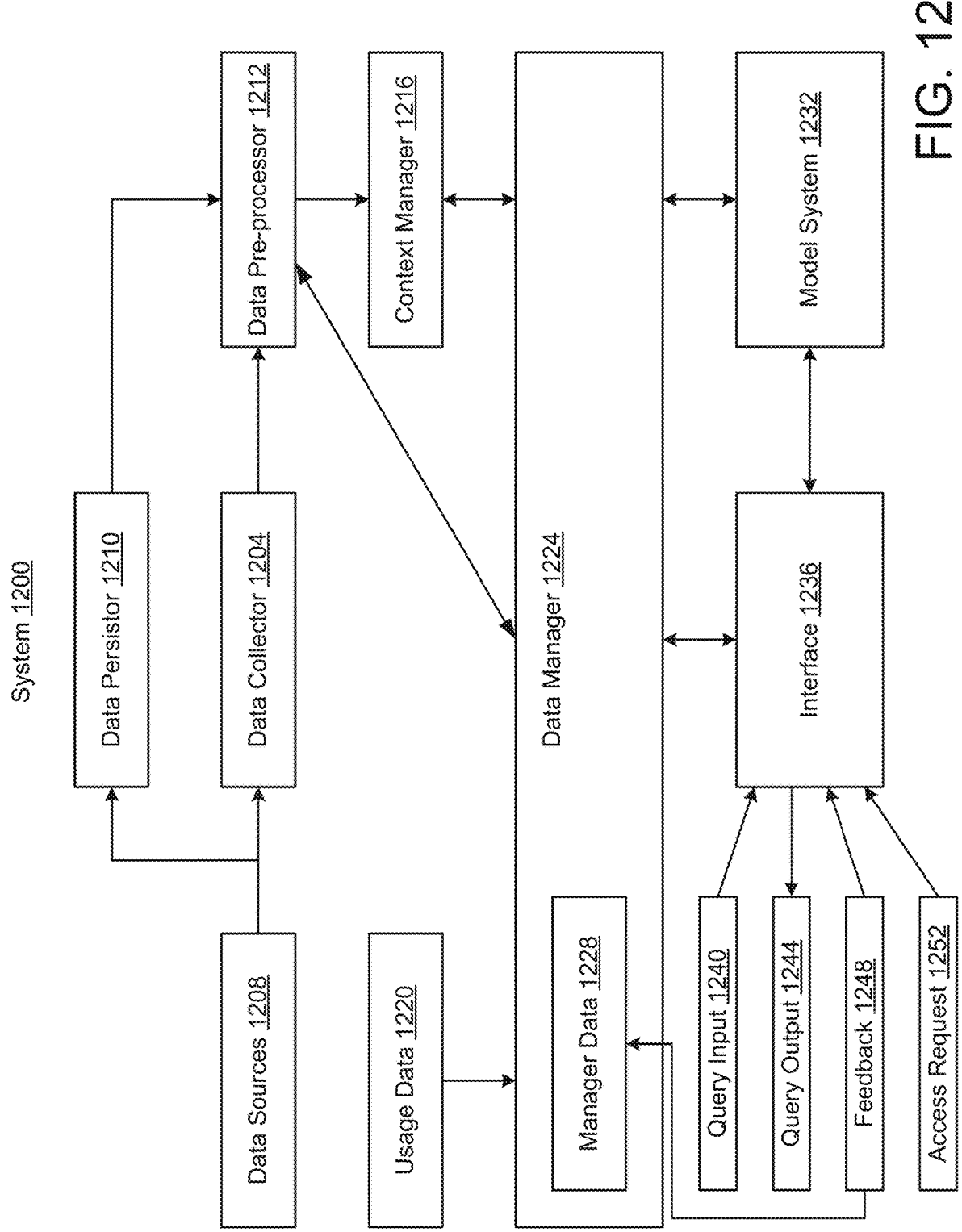
FIG. 12 is a block diagram of an example of a language model-based system for data structure generation.

FIG. 12 depicts an example of a system 1200, such as a conversational data catalog AI system. The system 1200 can be implemented by and/or incorporate features of various systems described herein. For example, at least some aspects of the data sources 1208, data manager 1224, and/or model system 1232 can incorporate features of the data repository 204, prompt management system 228, training management system 240, and/or model system 260 described with reference to FIGS. 2-7.

The system 1200 can include or be coupled with one or more data sources 1208. The data sources 1208 can be various databases (e.g., any of the databases of the data repository 204) storing sample data (e.g., analytics data, sensor data, telemetry data) collected from or otherwise associated with building management systems and their components (e.g., items of equipment, sensors evaluating items of equipment, controllers, communication systems, etc.). The data sources 1208 can further store various metadata or other information pertaining to the data stored within the databases. For example, the metadata can include indications or identifiers of the specific databases and/or tables in which the corresponding data is stored. The metadata can further include data definitions, master data, timeseries data, transaction data, etc.

The system 1200 can include at least one data collector 1204. The data collector 1204 can pull or extract all of the data stored within the various data sources. In some instances, the data collector 1204 initially pulls or extracts all of the sample data and associated metadata stored within the various data sources 1208 and thereafter pulls or extracts only differential or incremental sample data and associated metadata from the various data sources 1208.

In some implementations, the system 1200 can include at least one data persistor 1210. The at least one data persistor 1210 can persist the sample data and the metadata pulled or extracted from the various data sources 1208. For example, the data persistor 1210 can maintain at least one of sample data or metadata from one or more retrievals at one or more points in time from the data sources 1208, such as to maintain one or more states of data that may be consistent over points in time. This can allow, in some implementations, the data collector to more effectively perform differential data extraction from the data sources 1208.

The system 1200 can include at least one data pre-processor 1212. The data pre-processor 1212 can transform the sample data and the metadata into a structure suitable for model training. For example, the data pre-processor 1212 can tabulate or otherwise arrange the sample data and/or metadata by source, database, table, column, data definition, context of the data to be used for training a machine learning model (e.g., a large language model).

In some implementations, the system 1200 includes at least one context manager 1216. The context manager 1216 can prepare building data knowledge context to be appended, mapped to, or otherwise combined with the various sample data and/or metadata to provide additional context pertaining to the sample data and/or metadata with respect to one or more of buildings, building subsystems, or other components or equipment of buildings. In some instances, the context manager 1216 can utilize or otherwise implement a resource description framework.

In some instances, the context manager 1216 can include, be coupled with, or otherwise obtain knowledge graph data associated with a building, as discussed above, with respect to step 805 of FIG. 8. The knowledge graph can include various parent/child relationship information and upstream/downstream relationship information pertaining to the buildings, building subsystems, or other components or equipment of the buildings to which the collected sample data and/or metadata pertains.

As such, the context manager 1216 can utilize the knowledge graph to append, map, or otherwise add context to the sample data and/or metadata relating to the building, building subsystems, or other components to which the sample data and/or metadata pertains. For example, the context can include locational context, such as a building, a floor, a room, a space, etc., from which the data is collected. The context can also include relational context, such as upstream and downstream devices associated with the data, areas affecting/affected by the device that collects the data, etc. As such, the context manager 1216 can create a data hierarchy for the data based on the locational and relational context of the data. In some instances, the context may further include various enriched data from the knowledge graph, in accordance with the knowledge graph enrichment discussed above, with respect to step 810 of FIG. 8.

As depicted in FIG. 12, the system 1200 can include or access various usage data 1220. The usage data 1220 can provide additional context regarding the manner in which data from the data sources 1208 (or from similar data sources, such as used by other building management systems) is accessed, retrieved, processed, loaded, or otherwise used. For example, the usage data 1220 can include a historical access log relating to the data. The historical access log can include a log of who accessed or retrieved various data, as well as when the data was accessed or retrieved. The usage data 1220 can further include various access control information. The access control information can include various indications of which users have access to which data and/or data sources 1208. The usage data 1220 can further include various extract, transform, and load (ETL) job processing logs. The ETL job processing logs can include various indications of historical data combinations, organizations, tabulations, cleanings, etc.

The system 1200 can include at least one data manager 1224, which can operate as a metadata/data abstraction layer. The data manager 1224 receives and stores, structures, or otherwise maintains all of the data (e.g., metadata, sample data, building context, usage data) from the various sources described above (e.g., the data sources 1208, the context manager 1216, and the usage data 1220) as manager data 1228. In some instances, the data manager 1224 receives the data discussed above once or on a periodic basis (e.g., a schedule or an event basis) and then receives only differential or incremental extracts from each of the sources described above. As such, the manager data 1228 can include historical data, as well as the latest available data (e.g., real-time data, near-real time data, incremental data, differential data).

Accordingly, the data manger 1224 can act as a repository that includes all of the relevant information pertaining to the data discussed above. As such, the data manager 1224 can create, structure, and/or otherwise provide a ready-to-use dataset fused from multiple disparate data sources (e.g., data sources 1208) within an enterprise or building management system. The data manager 1224 can further provide an automated data processing pipeline that pulls in, transforms, and delivers a variety of data (e.g., sample data, metadata, contextual data, usage date) to be used for training and updating machine learning model(s) of the model system 1232. Accordingly, the data manager 1224 can as a metadata abstraction layer for historic and incremental ingestion to the machine learning model(s) of the model system 1232.

The system 1200 can include at least one model system 1232. The model system 1232 can include one or more machine learning models, such as LLMs (e.g., models 268 described above with reference to FIGS. 2-7), and can configure (e.g., train, fine-tune, update, perform transfer learning on) the machine learning model(s) according to data from the data manager 1224. Specifically, the model system 1232 can configure the machine learning model(s) using the data from the data manager 1224 to provide a machine learning-powered (e.g., LLM-powered) metadata ingestor capable of understanding commonality between disparate datasets and the features within those datasets.

For example, in some instances, the model system 1232 can configure a foundational LLM (e.g., GPT model, etc.) using the metadata, the sample data, the contextual data, and the usage data discussed above, with respect to the data manager 1224, to create a fine-tuned LLM that, when utilized with a conversational interface, acts as a data catalog that allows users to obtain data availability and quality information for buildings, building subsystems, or other components or equipment of buildings, as described herein. In some instances, the model system 1232 can configured the foundational LLM a single time to create the fine-tuned LLM. In some other instances, the model system 1232 configure and reconfigure the foundational LLM to create and then periodically update the fine-tuned LLM to ensure that the fine-tuned LLM is up to date.

While the description provided herein makes reference to a "fine-tuned LLM," in some embodiments, the system 1200 and/or the method 1300 described herein may utilize various other model types to achieve similar functionality. For example and without limitation, the system 1200 and/or the method 1300 can utilize one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

In some instances, by fine-tuning the LLM using the various data from the data manager 1224, the fine-tuned LLM of the model system 1232 can provide or determine various hidden relationships between data at various levels (e.g., bottom to top levels) of data structures, such as by using the language processing capabilities of the LLM to relate data elements at different levels based on the language used as the data definitions (e.g., where the structure, such as hierarchical structures, between the data elements would otherwise obscure the relations if parsed using other techniques).

Referring further to FIG. 12, the system 1200 can include or be coupled with at least one interface 1236. The interface 1236 can incorporate features of and/or provide functionality such as that described with reference to application session 308. In some instances, the interface 1236 is a conversational interface. For example, in some instances, the interface 1236 can include a display device, an audio input device, an audio output device, and/or any other suitable input/output devices configured to allow users to input prompts and receive outputs.

Accordingly, the interface 1236 can receive a query input 1240 from a user (e.g., via the client device 304). Upon receiving the query input 1240, the interface 1236, the model system 1232 (e.g., the fine-tuned LLM), and the data manager 1224 can communicate to generate a query output 1244, as will be described in detail below, with respect to FIG. 13. Accordingly, the interface 1236 (via communication with the data manager 1224 and the model system 1232) provides a conversational data catalog interface that a user can use to find data, find information about data, query samples, obtain exploratory data analysis aggregate data, etc.

The interface 1236 can further receive feedback 1248 from a user, which the interface 1236 can feed back into the data manager 1224 to update the manager data 1228 (e.g., modifying existing manager data or being stored as additional manager data). The interface 1236 can further receive user data access requests and communicate with one or more data access management systems associated with one or more of the data sources 1208 to allow or disallow access to the user (e.g., based on one or more credentials of the user). As such, in some instances, the interface 1236 can automatically manage data access policies associated with the various data sources 1208 of the system 1200.

Figure 13:
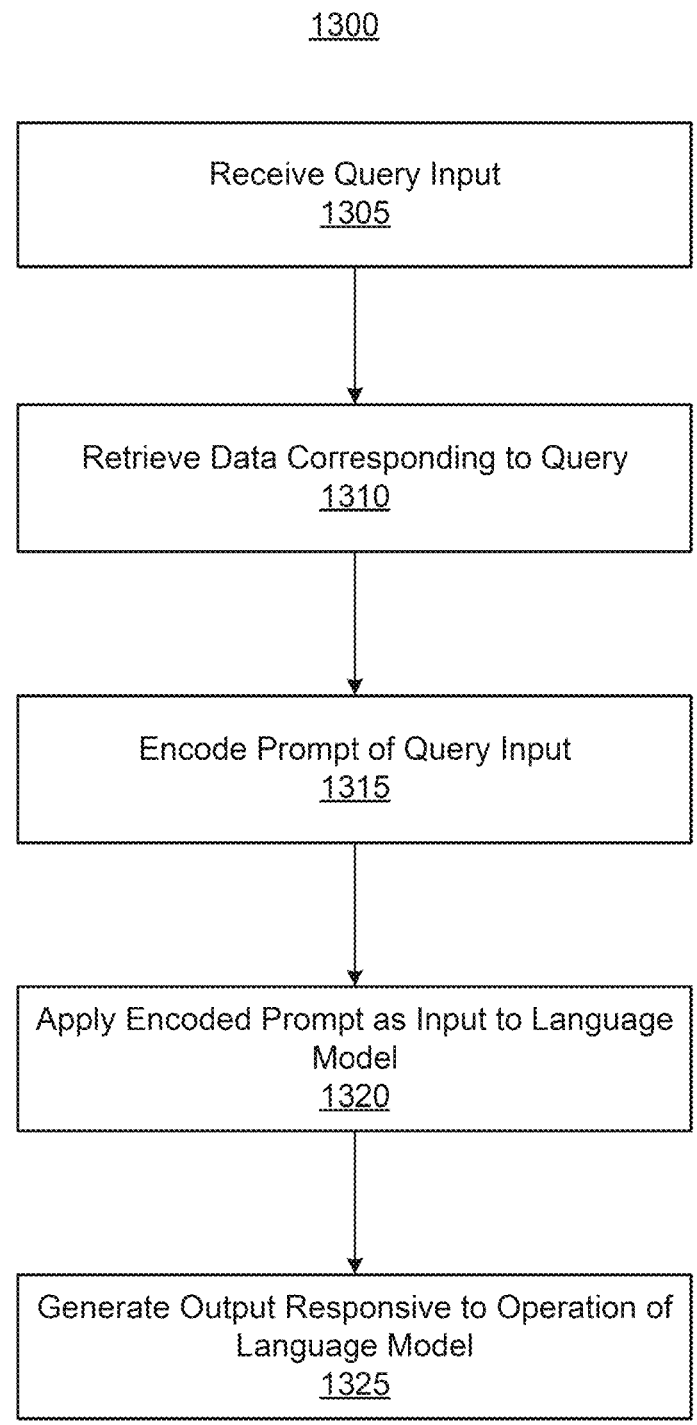
FIG. 13 is a flow diagram of an example method of implementing the language model-based system of FIG. 12.

FIG. 13 depicts an example of a method 1300 of implementing a data catalog AI. The method 1300 can be implemented using various systems described herein, such as the system 1200. The method 1300 can be utilized to generate an output responsive to operation of the find-tuned LLM discussed above, with respect to the model system 1232.

The system (e.g., the interface 1236) can receive a query input, at step 1305. The query input can include a prompt for various information (e.g., availability information, source information, location information, quality information) pertaining to data collected for an enterprise, facility, building, campus, system, subsystem, piece of equipment, etc. In some instances, the request can be limited to or otherwise associated with a particular characteristic or category of data, such as equipment failure data, energy savings data, sustainability data, net-zero data, etc.

Data corresponding to the query can then be retrieved, at step 1310. In some instances, various data can be retrieved by the interface 1236 and/or the model system 1232 from the data manager 1224 (e.g., the manager data 1228). For example, the interface 1236 and/or model system 1232 can retrieve data from the data manager 1224 based on various keywords or other indicators within the prompt of the query input. In some implementations, the model system 1232 (e.g., one or more LLMs of the model system 1232) can configure a database query for the data manager 1224 according to the query input. In some instances, the data retrieved, at step 1310, can include differential or incremental data (e.g., sample data, metadata) captured after the data used to train the foundational LLM (i.e., to create the fine-tuned LLM) to provide real-time or near real-time data so that the outputs (described below) are in line with both historical data and any recent differential data.

The prompt of the query input can then be encoded, at step 1315. For example, the interface 1236 can encode the received prompt to prepare the query input 1240 for application to the fine-tuned LLM of the model system 1232. In some instances, the interface 1236 uses or otherwise incorporates the data retrieved from the data manager 1224 when encoding the received prompt. In either case, the encoded prompt can then be applied to the fine-tuned LLM, at step 1320.

An output can then be generated responsive to the operation of the fine-tuned LLM, at step 1325. The output can generated and decoded by the model system 1232 (e.g., the fine-tuned LLM) prior to being transmitted to the interface 1236 for display as a human-readable output that is responsive to the prompt received from the user.

Now that the system 1200 and the method 1300 have been generally discussed above, various specific use cases will be described below. It should be appreciated that these use cases are provided as examples and are in no way meant to be limiting. In other examples, other input queries and responsive outputs can be generated using the system 1200 and method 1300 described above without departing from the scope of the present disclosure.

As one example, a user may provide an input query using the interface 1236 (e.g., via a conversational chatbot, voice assistant, etc.) asking where the user can find equipment failure related data. In this scenario, the model system 1232 may, in accordance with the method 1300 described above, generate an output that is transmitted to the interface 1236 to be provided to the user that indicates a variety of information pertaining to the equipment failure related data within the system 1200. For example, in some instances, the output in this scenario can include a list of data sources (e.g., databases, schemas, tables) including equipment failure related data, hierarchical or relational data information based on the building knowledge graph context (e.g., a tree diagram showing where certain data is being collected and how that relates to other assets within a building), one or more previews of the types of sample data collected pertaining to equipment failure related data (e.g., an equipment ID, an equipment name value, a failure reason category), access history associated with equipment failure related data, and other insights pertaining to the data itself (e.g., there is additional data related to equipment failure in another database to which the user does not have access).

As another example, a user may provide an input query using the interface 1236 asking from where and how a particular table is populated. For example, in response to receiving the output relating to the equipment failure described above, the user may ask how a particular equipment failure data table is populated. In this scenario, the model system 1232 may, in accordance with the method 1300 described above, generate an output (e.g., based on ETL processing logs) including an answer (e.g., "the Failure Equipment table is being populated from timeseries data source A") and lineage information relating to the data source (e.g., data source A pulls from job B, which pulls data from asset X and timeseries data from timeseries Y), as well as any findings pertaining to the data population (e.g., "the Failure Equipment table population has issues with ETL job processing").

As mentioned above, it will be appreciated that a user may ask a variety of differing questions pertaining to the data stored within the system 1200. For example, in other examples, the user may ask (e.g., via the interface 1236) "can you tell me about all data sources that I might be interested in when it comes to sustainability" or "give me all of the data from my building that has to do with sustainability," and the model system 1232 (e.g., the fine-tuned LLM) can (1) determine what data (e.g., sample data, metadata, contextual data, usage data) pertains to "sustainability" and (2) provide the user with a variety of information about that data. The user could similarly ask about a variety of other data categories or characteristics (e.g., energy, air quality, comfort, net-zero, operations). In any case, the information provided to the user can include, for example, which databases are storing the data, how the data flows to and from those data sources, where the data is collected from (e.g., a particular device or sensor, a location within a building, a geographical location of a building within an enterprise), what type of data is collected, how the data is aggregated and/or populated within various storage tables, etc.

Accordingly, the fine-tuned LLM model discussed herein is configured to provide a conversational interface (e.g., the interface 1236), where a user (e.g., a data analyst) can simply ask about data availability and/or quality across an entire enterprise, building, sub-system, group of devices, etc., that falls under various categories (e.g., equipment failure, sustainability, comfort, operations). That is, users can provide prompts in plain English language (e.g., a natural language representation or a semantic representation as opposed to a specific programming language input query) to request a variety of information pertaining to data stored within the system 1200 (e.g., requesting samples of various datasets, requesting the model system 1232 to do a preliminary exploratory data analysis). The system therefore allows the user (e.g., the analyst) to first check what data is available and how good the quality of the data is before delving into any deeper analysis.

Furthermore, in some instances, the output(s) provided by the system 1200 (e.g., via the model system 1232 and the interface 1236) may be utilized as input(s) to one or more additional models to train and/or obtain more in-depth analyses of the data. In some instances, by using the output provided by the model system 1232 and the interface 1236, subsequent models can be trained and provide corresponding outputs more quickly as compared to using the entire data set captured by the system 1200. Similarly, in some instances, the output(s) provided via the model system 1232 and the interface 1236 can enable data as a service functionality or be provided to other systems generally for use in data analytics.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method, comprising:
receiving, by one or more processors associated with a building management system, an unstructured query in the form of at least one of a natural language representation or a semantic representation, the unstructured query including a request for one or more of lineage information, availability information, or quality information regarding a category of data associated with the building management system, the category of data relating to one or more of equipment failure, sustainability, comfort, operations, energy, air quality, or net-zero emissions;
applying, by the one or more processors, the unstructured query as input to a machine learning model, the machine learning model configured using training data comprising sample data and metadata from a plurality of data sources of the building management system;
generating, by the one or more processors using the machine learning model, an output indicating the one or more of the lineage information, the availability information, or the quality information regarding the category of data; and
presenting, by the one or more processors using at least one of a display device or an audio output device, the output.

2. The method of claim 1, wherein the machine learning model comprises at least one of a large language model (LLM), a generative artificial intelligence (AI) model, or a neural network comprising a transformer.

3. The method of claim 2, wherein the machine learning model is configured by fine tuning the machine learning model using the training data.

4. The method of claim 1, wherein at least one of the query is received or the output is presented via a conversational interface.

5. The method of claim 1, wherein the training data includes at least one of master data, timeseries data, transaction data, or a data definition.

6. The method of claim 1, further comprising retrieving, by the one or more processors, context from a data manager pertaining to the unstructured query, and wherein applying the unstructured query as input to the machine learning model includes applying the unstructured query and the context retrieved from the data manager to the machine learning model.

7. The method of claim 6, wherein the context includes information relating to at least one of an access controls list, data usage history, or extract, transform, and load (ETL) job processing logs.

8. The method of claim 1, further comprising:
receiving, by the one or more processors, feedback regarding the output; and
applying, by the one or more processors, the feedback to the machine learning model.

9. The method of claim 8, wherein the training data used to configure the machine learning model is stored within a data manager, and the method further comprises updating, by the one or more processors, the data manager using one or more of the unstructured query, the output, or the feedback.

10. A building management system, comprising:
one or more processors to:
receive an unstructured query in the form of at least one of a natural language representation or a semantic representation, the unstructured query including a request for one or more of lineage information, availability information, or quality information regarding a category of data associated with the building management system, the category of data relating to one or more of equipment failure, sustainability, comfort, operations, energy, air quality, or net-zero emissions;
apply the unstructured query as input to a machine learning model, the machine learning model fine-tuned using training data comprising sample data and metadata from a plurality of data sources of the building management system, wherein the machine learning model comprises at least one of a large language model (LLM), a generative artificial intelligence (AI) model, or a neural network comprising a transformer;
generate, using the machine learning model, an output indicating the one or more of the lineage information, the availability information, or the quality information regarding the category of data; and
present, using at least one of a display device or an audio output device, the output.

11. The building management system of claim 10, wherein the one or more processors are to retrieve a context pertaining to the unstructured query from a data manager, and wherein applying the unstructured query as input to the machine learning model includes applying the unstructured query and the context retrieved from the data manager to the machine learning model.

12. A method, comprising:
retrieving, by one or more processors, a plurality of data elements from at least one data source coupled with a building management system, the plurality of data elements comprising at least one of sample data regarding one or more items of equipment associated with the building management system or metadata indicative of a definition of the sample data;
structuring, by the one or more processors, the plurality of data elements into training data for a machine learning model by mapping the plurality of data elements to a building knowledge graph data structure corresponding to the one or more items of equipment; and
applying, by the one or more processors as input to the machine learning model, the training data to configure the machine learning model according to the training data.

13. The method of claim 12, wherein mapping the plurality of data elements to the building knowledge graph data structure comprises mapping the plurality of data elements to corresponding nodes of the building knowledge graph data structure.

14. The method of claim 12, further comprising:
applying, by the one or more processors as input to the machine learning model, context data regarding at least one of access controls for the at least one data source, usage of the at least one data source, or data processing log information regarding the at least one data source.

15. The method of claim 14, wherein applying the context data includes combining the context data with corresponding data elements of the plurality of data elements prior to structuring the plurality of data elements into the training data for the machine learning model.

16. The method of claim 14, further comprising combining the context data with corresponding data elements based on mapping of the plurality of data elements to a plurality of nodes of the building knowledge graph data structure that are respectively associated with the one or more items of equipment.

17. The method of claim 12, wherein the sample data includes at least one of analytics data, sensor data, or telemetry data and the metadata includes one or more of the definition of the sample data, master data, timeseries data, or transaction data.

18. The method of claim 12, wherein the training data is initial training data and the initial training data is applied to configure the machine learning model in at least one first instance, and the method further comprises:

subsequent to applying the training data to configure the machine learning model in the at least one first instance, retrieving, by the one or more processors, from the at least one data source, a plurality of differential data elements comprising at least one of differential sample data regarding the one or more items of equipment or differential metadata indicative of a definition of the differential sample data;

structuring, by the one or more processors according to the at least one of the differential sample data or the differential metadata, the plurality of differential data elements into differential training data; and applying, by the one or more processors as supplemental input to the machine learning model, the differential training data to update or reconfigure the machine learning model according to the differential training data.

19. The method of claim 12, wherein the machine learning model comprises at least one of a large language model (LLM), a generative artificial intelligence (AI) model, or a neural network comprising a transformer.

20. The method of claim 19, wherein the machine learning model is configured by fine tuning the machine learning model using the training data.

* * * * *